US012659916B2

(12) United States Patent
Zhang et al.

(10) Patent No.: US 12,659,916 B2
(45) Date of Patent: Jun. 16, 2026

(54) TERMINAL DEVICE LOCATING METHOD, APPARATUS AND STORAGE MEDIUM

(71) Applicant: DATANG MOBILE COMMUNICATIONS EQUIPMENT CO., LTD., Beijing (CN)

(72) Inventors: Zhenyu Zhang, Beijing (CN); Bin Ren, Beijing (CN); Rongyi Fang, Beijing (CN); Gang Li, Beijing (CN); Ren Da, Beijing (CN); Shaohui Sun, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 281 days.

(21) Appl. No.: 18/571,243

(22) PCT Filed: Jun. 9, 2022

(86) PCT No.: PCT/CN2022/097975
§ 371 (c)(1),
(2) Date: Dec. 17, 2023

(87) PCT Pub. No.: WO2023/284457
PCT Pub. Date: Jan. 19, 2023

(65) Prior Publication Data
US 2024/0334372 A1 Oct. 3, 2024

(30) Foreign Application Priority Data
Jul. 16, 2021 (CN) .......................... 202110806523.5

(51) Int. Cl.
*H04W 64/00* (2009.01)
*G01S 5/02* (2010.01)
*G01S 5/14* (2006.01)

(52) U.S. Cl.
CPC ........... *H04W 64/00* (2013.01); *G01S 5/0218* (2020.05); *G01S 5/14* (2013.01)

(58) Field of Classification Search
CPC ......... H04W 64/00; G01S 5/0218; G01S 5/14
(Continued)

(56) References Cited

U.S. PATENT DOCUMENTS

2014/0329520 A1 11/2014 Militano et al.
2018/0255556 A1 9/2018 Das et al.
(Continued)

FOREIGN PATENT DOCUMENTS

CN 102421189 A 4/2012
CN 106488557 A * 3/2017
(Continued)

OTHER PUBLICATIONS

European Patent Office, Extended European Search Report Issued in Application No. 22841097.3, Oct. 23, 2024, Germany, 8 pages.
(Continued)

*Primary Examiner* — Michael R Neff
(74) *Attorney, Agent, or Firm* — Kilpatrick Townsend & Stockton LLP

(57) ABSTRACT

The present disclosure provides a terminal device locating method, an apparatus and a storage medium. The method includes: receiving, by a first network element, a reference signal; determining a time-domain channel response of the reference signal according to the reference signal; performing filtering processing on the time-domain channel response to obtain a line-of-sight time-domain signal; determining subcarrier phase information of a line-of-sight frequency-domain signal according to the line-of-sight time-domain signal, where the subcarrier phase information is
(Continued)

used to determine location information of a terminal device. The present disclosure can improve the accuracy of locating the terminal device.

20 Claims, 6 Drawing Sheets

(58) Field of Classification Search
USPC ..................................................... 455/456.1
See application file for complete search history.

(56) References Cited

U.S. PATENT DOCUMENTS

| | | | | |
|---|---|---|---|---|
| 2019/0053013 | A1 | 2/2019 | Markhovsky et al. | |
| 2020/0267681 | A1* | 8/2020 | Ferrari | H04B 17/27 |
| 2020/0408871 | A1* | 12/2020 | Da | G01S 5/0072 |
| 2021/0368338 | A1* | 11/2021 | Lord | H04W 64/00 |

FOREIGN PATENT DOCUMENTS

| | | | |
|---|---|---|---|
| CN | 108337197 A | * | 7/2018 |
| CN | 112543409 A | | 3/2021 |
| WO | 2021115687 A1 | | 6/2021 |

OTHER PUBLICATIONS

CATT, "Further discussion of NR RAT-dependent DL Positioning", 3GPP TSG RAN WG1 Meeting#96, Athens, Greece, Feb. 25-Mar. 1, 2019, total 30 pages, R1-1901980.

ISA State Intellectual Property Office of the People's Republic of China, International Search Report and Written Opinion Issued in Application No. PCT/CN2022/097975, Aug. 29, 2022, WIPO, 14 pages.

Office Action of Corresponding CN Patent Application No. 202110806523.5 Dated Jun. 27, 2025.

The Second office action issued in Chinese corresponding application 202110806523.5, mailed on Dec. 30, 2025.

* cited by examiner

1

TERMINAL DEVICE LOCATING METHOD, APPARATUS AND STORAGE MEDIUM

CROSS-REFERENCES TO RELATED APPLICATIONS

The present disclosure is a National Stage of International Application No. PCT/CN2022/097975, filed on Jun. 9, 2022, which claims priority to Chinese patent application No. 202110806523.5, filed to China National Intellectual Property Administration on Jul. 16, 2021 and entitled "TERMINAL DEVICE LOCATING METHOD, APPARATUS AND STORAGE MEDIUM". The content of the above applications are hereby incorporated by reference in their entireties.

FIELD

The present disclosure relates to the field of communication technologies and, in particular, to a terminal device locating method, an apparatus and a storage medium.

BACKGROUND

Location based services (LBS) technology is a service technology of acquiring terminal location information through a wireless communication network or other locating systems and then providing various location-related information for a terminal in combination with a geographic information system.

In the 3rd generation partnership project (3GPP), various methods of locating a terminal device by measuring a reference signal in a 3GPP wireless communication system are defined, such as downlink-time difference of arrival (DL-TDOA), uplink-time difference of arrival (UL-TDOA) and so on. In one embodiment, a transmitting end will send a known reference signal, and the reference signal has a pseudo-random sequence with good autocorrelation. A receiving end utilizes characteristics of the pseudo-random sequence to perform time of arrival (TOA) measurement by adopting a cross-correlation method, to determine a location of a terminal device.

However, the accuracy of the TOA measurement in the above locating methods is relatively low, which leads to relatively low accuracy of locating the terminal device.

SUMMARY

The present disclosure provides a terminal device locating method, an apparatus and a storage medium, which can improve the accuracy of locating a terminal device.

In one embodiment of the present disclosure provides a terminal device locating method, where the method is applied to a first network element, and the method includes:

receiving a reference signal;

determining a time-domain channel response of the reference signal according to the reference signal;

performing filtering processing on the time-domain channel response to obtain a line-of-sight time-domain signal;

determining subcarrier phase information of a line-of-sight frequency-domain signal according to the line-of-sight time-domain signal, where the subcarrier phase information is used to determine location information of a terminal device.

In this solution, because the line-of-sight time-domain signal can be obtained by performing filtering processing on the time-domain channel response of the reference signal, a multipath effect can be eliminated. According to the obtained line-of-sight time-domain signal, the subcarrier phase information of the line-of-sight frequency-domain signal corresponding to the line-of-sight time-domain signal can be directly extracted, and a propagation delay of the reference signal can be determined according to the subcarrier phase information. Since the propagation delay determined according to the subcarrier phase information of the line-of-sight frequency-domain signal is not affected by a sampling rate, the accuracy of the propagation delay can be improved through the above manner, and thus the accuracy of the location information of the terminal device determined based on the propagation delay can be further improved.

In a possible implementation, determining the subcarrier phase information of the line-of-sight frequency-domain signal according to the line-of-sight time-domain signal includes:

converting the line-of-sight time-domain signal into a frequency-domain signal through Fourier transform;

determining, according to an index of a subcarrier corresponding to the frequency-domain signal, a frequency-domain channel response of the subcarrier;

extracting the subcarrier phase information from the frequency-domain channel response.

In this solution, the line-of-sight time-domain signal can be converted into the frequency-domain signal through Fourier transform, and the frequency-domain channel response of the subcarrier can be determined according to the index of the subcarrier corresponding to the frequency-domain signal. Then the subcarrier phase information can be extracted from the frequency-domain channel response. In this way, the subcarrier phase information of the line-of-sight frequency-domain signal can be extracted, to ensure the accuracy of the determined location information of the terminal device.

In a possible implementation, determining the time-domain channel response of the reference signal according to the reference signal includes:

determining a frequency-domain channel response of a subcarrier corresponding to the reference signal according to the reference signal;

determining the time-domain channel response according to the frequency-domain channel response.

In this solution, by determining the frequency-domain channel response of the subcarrier corresponding to the reference signal and determining the time-domain channel response according to the frequency-domain channel response, it can be ensured that the subcarrier phase information can be extracted from the time-domain channel response, to determine the location information of the terminal device according to the extracted subcarrier phase information, to improve the accuracy of the determined location information of the terminal device.

In a possible implementation, performing filtering processing on the time-domain channel response to obtain the line-of-sight time-domain signal includes:

performing filtering processing on the time-domain channel response to obtain the line-of-sight time-domain signal according to the following formula:

$$h_{ic}^m[n] = \begin{cases} h^m[n], & n = [(t)_1] \\ 0, & \text{otherwise} \end{cases}, \text{where } h_{ic}^m[n]$$

represents the line-of-sight time-domain signal, h'''[n] represents a time-domain channel response of an m-th orthogonal frequency division multiplexing OFDM symbol at an n-th time-domain sampling point, $\dot{\tau}_1$ is a line-of-sight signal propagation delay of a reference signal between a network device and the terminal device, and n and m are positive integers.

In this solution, by performing filtering processing on the time-domain signal response, not only the multipath effect in a channel can be removed, but also noise of a received signal at other sampling points can be removed, to improve a frequency-domain signal-to-noise ratio.

In a possible implementation, the first network element is the terminal device, and the method further includes:

determining an integer ambiguity of a distance between the terminal device and a network device according to the subcarrier phase information;

determining a measurement distance between the terminal device and the network device according to the subcarrier phase information and the integer ambiguity;

determining the location information of the terminal device according to the measurement distance between the terminal device and the network device.

In this solution, after the integer ambiguity of the distance is determined through the subcarrier phase information, the measurement distance between the terminal device and the network device can be determined based on the integer ambiguity and the subcarrier phase information, thus completing terminal device locating. Since the measurement distance between the terminal device and the network device is determined based on the subcarrier phase information, that is, when there is a propagation delay of a signal between the terminal device and the network device, this propagation delay is not processed, the accuracy of the determined measurement distance between the terminal device and the network device is higher, and the accuracy of the terminal device locating is improved.

In a possible implementation, determining the measurement distance between the terminal device and the network device according to the subcarrier phase information and the integer ambiguity includes:

determining the measurement distance between the terminal device and the network device according to a formula $$d_r^i = \lambda\left(\phi_r^i + N_r^i\right)$$

where $$d_r^i$$

represents a measurement distance between an i-th network device and an r-th terminal device, $$\phi_r^i$$

represents subcarrier phase information from the i-th network device to the r-th terminal device, $\lambda$ represents a wavelength, $$N_r^i$$

represents an integer ambiguity of a distance between the i-th network device and the r-th terminal device, and both i and r are positive integers.

In this solution, when determining the measurement distance between the network device and the terminal device, the integer ambiguity of the distance between the network device and the terminal device is considered, to enable the determined measurement distance to be more accurate.

In a possible implementation, determining the integer ambiguity of the distance between the terminal device and the network device according to the subcarrier phase information includes:

acquiring a time of arrival TOA measurement value between the terminal device and the network device;

determining the integer ambiguity according to the subcarrier phase information and the TOA measurement value.

In this solution, the integer ambiguity can be determined according to the subcarrier phase information and the TOA measurement value, and the location information of the terminal device can be determined according to the determined integer ambiguity. Since the integer ambiguity is considered, the locating accuracy can be improved.

In a possible implementation, determining the integer ambiguity according to the subcarrier phase information and the TOA measurement value includes:

determining the integer ambiguity according a formula $$N_r^i = \left[\frac{T_r^i}{\lambda} - \phi_r^i\right],$$

where [*] represents rounding a number in parentheses, $$N_r^i$$

represents the integer ambiguity of the distance between the i-th network device and the r-th terminal device, $$T_r^i$$

represents a TOA measurement value between the i-th network device and the r-th terminal device, $$\phi_r^i$$

represents the subcarrier phase information from the i-th network device to the r-th terminal device, and $\lambda$ represents the wavelength.

In a possible implementation, the first network element is a network device, and the method further includes:

sending the subcarrier phase information to a location server, where the subcarrier phase information is used to indicate that the location server is to determine the location information of the terminal device.

In one embodiment of the present disclosure provides a terminal device locating method, where the method is applied to a location server, and the method includes:

receiving subcarrier phase information of a line-of-sight frequency-domain signal of a reference signal sent by a network device, where the line-of-sight frequency-domain signal is obtained by the network device in a following manner: determining a time-domain channel response of the reference signal after receiving the reference signal, performing filtering processing on the time-domain channel response, and converting an obtained line-of-sight time-domain signal, where the reference signal is sent by a terminal device to the network device;

determining location information of the terminal device according to the subcarrier phase information.

In a possible implementation, determining the location information of the terminal device according to the subcarrier phase information includes:

determining an integer ambiguity of a distance between the terminal device and the network device according to the subcarrier phase information;

determining a measurement distance between the terminal device and the network device according to the subcarrier phase information and the integer ambiguity;

determining the location information of the terminal device according to the measurement distance between the terminal device and the network device.

In a possible implementation, determining the measurement distance between the terminal device and the network device according to the subcarrier phase information and the integer ambiguity includes:

determining the measurement distance between the terminal device and the network device according to a formula $$d_r^i = \lambda\left(\phi_r^i + N_r^i\right)$$

where $$d_r^i$$

represents a measurement distance between an i-th network device and an r-th terminal device, $$\phi_r^i$$

represents subcarrier phase information from the i-th network device to the r-th terminal device, λ represents a wavelength, $$N_r^i$$

represents an integer ambiguity of a distance between the i-th network device and the r-th terminal device, and both i and r are positive integers.

In a possible implementation, determining the integer ambiguity of the distance between the terminal device and the network device according to the subcarrier phase information includes:

receiving a time of arrival TOA measurement value between the terminal device and the network device sent by the network device;

determining the integer ambiguity according to the subcarrier phase information and the TOA measurement value.

In a possible implementation, determining the integer ambiguity according to the subcarrier phase information and the TOA measurement value includes:

determining the integer ambiguity according a formula $$N_r^i = \left[\frac{T_r^i}{\lambda} - \phi_r^i\right],$$

where [*] represents rounding a number in parentheses, $$N_r^i$$

represents the integer ambiguity of the distance between the i-th network device and the r-th terminal device, $$T_r^i$$

represents a TOA measurement value between the i-th network device and the r-th terminal device, $$\phi_r^i$$

represents the subcarrier phase information from the i-th network device to the r-th terminal device, and λ represents the wavelength.

In still another embodiment of the present disclosure provides a terminal device locating apparatus, including a memory, a transceiver and a processor;

the memory is configured to store a computer program; the transceiver is configured to transceive data under control of the processor; the processor is configured to read the computer program in the memory and execute the following operations:

receiving a reference signal;

determining a time-domain channel response of the reference signal according to the reference signal;

performing filtering processing on the time-domain channel response to obtain a line-of-sight time-domain signal;

determining subcarrier phase information of a line-of-sight frequency-domain signal according to the line-of-sight time-domain signal, where the subcarrier phase information is used to determine location information of a terminal device.

In a possible implementation, the processor is specifically configured to:

convert the line-of-sight time-domain signal into a frequency-domain signal through Fourier transform;

determine, according to an index of a subcarrier corresponding to the frequency-domain signal, a frequency-domain channel response of the subcarrier;

extract the subcarrier phase information from the frequency-domain channel response.

In a possible implementation, the processor is specifically configured to:

determine a frequency-domain channel response of a subcarrier corresponding to the reference signal according to the reference signal;

determine the time-domain channel response according to the frequency-domain channel response.

In a possible implementation, the processor is specifically configured to:

perform filtering processing on the time-domain channel response to obtain the line-of-sight time-domain signal according to the following formula:

$$h_{ic}^m[n] = \begin{cases} h^m[n], & n = [\dot{\tau}_1] \\ 0, & \text{otherwise} \end{cases},$$

where $$h_{ic}^m[n]$$

represents the line-of-sight time-domain signal, $h^m[n]$ represents a time-domain channel response of an m-th orthogonal frequency division multiplexing OFDM symbol at an n-th time-domain sampling point, $\dot{\tau}_1$ is a line-of-sight signal propagation delay of a reference signal between a network device and the terminal device, and n and m are positive integers.

In a possible implementation, the apparatus is the terminal device; and the processor is specifically configured to:

determine an integer ambiguity of a distance between the terminal device and a network device according to the subcarrier phase information;

determine a measurement distance between the terminal device and the network device according to the subcarrier phase information and the integer ambiguity;

determine the location information of the terminal device according to the measurement distance between the terminal device and the network device.

In a possible implementation, the processor is specifically configured to:

determine the measurement distance between the terminal device and the network device according to a formula $$d_r^i = \lambda\left(\phi_r^i + N_r^i\right)$$

where $$d_r^i$$

represents a measurement distance between an i-th network device and an r-th terminal device, $$\phi_r^i$$

represents subcarrier phase information from the i-th network device to the r-th terminal device, $\lambda$ represents a wavelength, $$N_r^i$$

represents an integer ambiguity of a distance between the i-th network device and the r-th terminal device, and both i and r are positive integers.

In a possible implementation, the processor is specifically configured to:

acquire a time of arrival TOA measurement value between the terminal device and the network device;

determine the integer ambiguity according to the subcarrier phase information and the TOA measurement value.

In a possible implementation, the processor is specifically configured to:

determine the integer ambiguity according a formula $$N_r^i = \left[\frac{T_r^i}{\lambda} - \phi_r^i\right],$$

where [*] represents rounding a number in parentheses, $$N_r^i$$

represents the integer ambiguity of the distance between the i-th network device and the r-th terminal device, $$T_r^i$$

represents a TOA measurement value between the i-th network device and the r-th terminal device, $$\phi_r^i$$

represents the subcarrier phase information from the i-th network device to the r-th terminal device, and $\lambda$ represents the wavelength.

In a possible implementation, the apparatus is a network device; and the processor is specifically configured to:

send the subcarrier phase information to a location server, where the subcarrier phase information is used to indicate that the location server is to determine the location information of the terminal device.

In still another embodiment of the present disclosure provides a terminal device locating apparatus, including a memory, a transceiver and a processor;

the memory is configured to store a computer program; the transceiver is configured to transceive data under control of the processor; the processor is configured to read the computer program in the memory and execute the following operations:

receiving subcarrier phase information of a line-of-sight frequency-domain signal of a reference signal sent by a network device, where the line-of-sight frequency-domain signal is obtained by the network device in a following manner: determining a time-domain channel response of the reference signal after receiving the reference signal, performing filtering processing on the time-domain channel response, and converting an obtained line-of-sight time-domain signal, where the reference signal is sent by a terminal device to the network device;

determining location information of the terminal device according to the subcarrier phase information.

In a possible implementation, the processor is specifically configured to:

determine an integer ambiguity of a distance between the terminal device and the network device according to the subcarrier phase information;

determine a measurement distance between the terminal device and the network device according to the subcarrier phase information and the integer ambiguity;

determine the location information of the terminal device according to the measurement distance between the terminal device and the network device.

In a possible implementation, the processor is specifically configured to:

determine the measurement distance between the terminal device and the network device according to a formula $$d_r^i = \lambda \left( \phi_r^i + N_r^i \right)$$

where $$d_r^i$$

represents a measurement distance between an i-th network device and an r-th terminal device, $$\phi_r^i$$

represents subcarrier phase information from the i-th network device to the r-th terminal device, $\lambda$ represents a wavelength, $$N_r^i$$

represents an integer ambiguity of a distance between the i-th network device and the r-th terminal device, and both i and r are positive integers.

In a possible implementation, the processor is specifically configured to:

receive a time of arrival TOA measurement value between the terminal device and the network device sent by the network device;

determine the integer ambiguity according to the subcarrier phase information and the TOA measurement value.

In a possible implementation, the processor is specifically configured to:

determine the integer ambiguity according a formula $$N_r^i = \left[ \frac{T_r^i}{\lambda} - \phi_r^i \right],$$

10 where [*] represents rounding a number in parentheses, $$N_r^i$$

represents the integer ambiguity of the distance between the i-th network device and the r-th terminal device, $$T_r^i$$

represents a TOA measurement value between the i-th network device and the r-th terminal device, $$\phi_r^i$$

represents the subcarrier phase information from the i-th network device to the r-th terminal device, and $\lambda$ represents the wavelength.

In still another embodiment of the present disclosure provides a terminal device locating apparatus, including:

a receiving unit, configured to receive a reference signal;

a processing unit, configured to determine a time-domain channel response of the reference signal according to the reference signal;

where the processing unit is further configured to perform filtering processing on the time-domain channel response to obtain a line-of-sight time-domain signal;

the processing unit is further configured to determine subcarrier phase information of a line-of-sight frequency-domain signal according to the line-of-sight time-domain signal, where the subcarrier phase information is used to determine location information of a terminal device.

In a possible implementation, the processing unit is specifically configured to:

convert the line-of-sight time-domain signal into a frequency-domain signal through Fourier transform;

determine, according to an index of a subcarrier corresponding to the frequency-domain signal, a frequency-domain channel response of the subcarrier;

extract the subcarrier phase information from the frequency-domain channel response.

In a possible implementation, the processing unit is specifically configured to:

determine a frequency-domain channel response of a subcarrier corresponding to the reference signal according to the reference signal;

determine the time-domain channel response according to the frequency-domain channel response.

In a possible implementation, the processing unit is specifically configured to:

perform filtering processing on the time-domain channel response to obtain the line-of-sight time-domain signal according to the following formula:

$$h_{ic}^m[n] = \begin{cases} h^m[n], & n = [\hat{t}_1] \\ 0, & \text{otherwise} \end{cases},$$

where $$h_{ic}^m[n]$$

represents the line-of-sight time-domain signal, $h'''[n]$ represents a time-domain channel response of an m-th orthogonal frequency division multiplexing OFDM symbol at an n-th time-domain sampling point, $\dot{\tau}_1$ is a line-of-sight signal propagation delay of a reference signal between a network device and the terminal device, and n and m are positive integers.

In a possible implementation, the apparatus is the terminal device; and the processing unit is specifically configured to:

determine an integer ambiguity of a distance between the terminal device and a network device according to the subcarrier phase information;

determine a measurement distance between the terminal device and the network device according to the subcarrier phase information and the integer ambiguity;

determine the location information of the terminal device according to the measurement distance between the terminal device and the network device.

In a possible implementation, the processing unit is specifically configured to:

determine the measurement distance between the terminal device and the network device according to a formula $$d_r^i = \lambda\left(\phi_r^i + N_r^i\right)$$

where $$d_r^i$$

represents a measurement distance between an i-th network device and an r-th terminal device, $$\phi_r^i$$

represents subcarrier phase information from the i-th network device to the r-th terminal device, $\lambda$ represents a wavelength, $$N_r^i$$

represents an integer ambiguity of a distance between the i-th network device and the r-th terminal device, and both i and r are positive integers.

In a possible implementation, the processing unit is specifically configured to:

acquire a time of arrival TOA measurement value between the terminal device and the network device;

determine the integer ambiguity according to the subcarrier phase information and the TOA measurement value.

In a possible implementation, the processing unit is specifically configured to:

determine the integer ambiguity according a formula $$N_r^i = \left[\frac{T_r^i}{\lambda} - \phi_r^i\right],$$

where [*] represents rounding a number in parentheses, $$N_r^i$$

represents the integer ambiguity of the distance between the i-th network device and the r-th terminal device, $$T_r^i$$

represents a TOA measurement value between the i-th network device and the r-th terminal device, $$\phi_r^i$$

represents the subcarrier phase information from the i-th network device to the r-th terminal device, and $\lambda$ represents the wavelength.

In a possible implementation, the apparatus is a network device; and the processing unit is specifically configured to:

send the subcarrier phase information to a location server, where the subcarrier phase information is used to indicate that the location server is to determine the location information of the terminal device.

In yet another embodiment of the present disclosure provides a terminal device locating apparatus, including:

a receiving unit, configured to receive subcarrier phase information of a line-of-sight frequency-domain signal of a reference signal sent by a network device, where the line-of-sight frequency-domain signal is obtained by the network device in a following manner: determining a time-domain channel response of the reference signal after receiving the reference signal, performing filtering processing on the time-domain channel response, and converting an obtained line-of-sight time-domain signal, where the reference signal is sent by a terminal device to the network device;

a processing unit, configured to determine location information of the terminal device according to the subcarrier phase information.

In one embodiment, the processing unit is specifically configured to:

determine an integer ambiguity of a distance between the terminal device and the network device according to the subcarrier phase information;

determine a measurement distance between the terminal device and the network device according to the subcarrier phase information and the integer ambiguity;

determine the location information of the terminal device according to the measurement distance between the terminal device and the network device.

In one embodiment, the processing unit is specifically configured to:

determine the measurement distance between the terminal device and the network device according to a formula $$d_r^i = \lambda\left(\phi_r^i + N_r^i\right),$$

where $$d_r^i$$

represents a measurement distance between an i-th network device and an r-th terminal device, $$\phi_r^i$$

represents subcarrier phase information from the i-th network device to the r-th terminal device, $\lambda$ represents a wavelength, $$N_r^i$$

represents an integer ambiguity of a distance between the i-th network device and the r-th terminal device, and both i and r are positive integers.

In one embodiment, the processing unit is specifically configured to:

receive a time of arrival TOA measurement value between the terminal device and the network device sent by the network device;

determine the integer ambiguity according to the subcarrier phase information and the TOA measurement value.

In one embodiment, the processing unit is specifically configured to:

determine the integer ambiguity according a formula $$N_r^i = \left[ \frac{T_r^i}{\lambda} - \phi_r^i \right],$$

where [*] represents rounding a number in parentheses, $$N_r^i$$

represents the integer ambiguity of the distance between the i-th network device and the r-th terminal device, $$T_r^i$$

represents a TOA measurement value between the i-th network device and the r-th terminal device, $$\phi_r^i$$

represents the subcarrier phase information from the i-th network device to the r-th terminal device, and $\lambda$ represents the wavelength.

In yet another embodiment of the present disclosure provides a processor-readable storage medium, where the processor-readable storage medium stores a computer program, and the computer program is used to cause a processor to execute the terminal device locating method according to any one of the above possible implementations.

In yet another embodiment of the present disclosure provides a computer program product, including a computer program, where when the computer program is executed by a processor, the terminal device locating method according to any one of the above possible implementations is implemented.

The present disclosure provides a terminal device locating method, an apparatus and a storage medium. The time-domain channel response of the reference signal is determined according to the received reference signal; filtering processing is performed on the time-domain channel response to obtain the line-of-sight time-domain signal; and the subcarrier phase information of the line-of-sight frequency-domain signal corresponding to the line-of-sight time-domain signal is determined according to the line-of-sight time-domain signal, where the subcarrier phase information is used to determine the location information of the terminal device. Because the line-of-sight time-domain signal can be obtained by performing filtering processing on the time-domain channel response of the reference signal, a multipath effect can be eliminated. According to the obtained line-of-sight time-domain signal, the subcarrier phase information of the line-of-sight frequency-domain signal corresponding to the line-of-sight time-domain signal can be directly extracted, and a propagation delay of the reference signal can be determined according to the subcarrier phase information. Since the propagation delay determined according to the subcarrier phase information of the line-of-sight frequency-domain signal is not affected by a sampling rate, the accuracy of the propagation delay can be improved through the above manner, and thus the accuracy of the location information of the terminal device determined based on the propagation delay can be further improved.

It should be understood that the content described in the SUMMARY section is not intended to limit essential or important features of the embodiments of the present disclosure, nor is it intended to limit the scope of the present disclosure. Other embodiments of the present disclosure will be readily understood from the following description.

BRIEF DESCRIPTION OF DRAWINGS

In order to explain solutions in the present disclosure or in the related art more clearly, drawings required to be used in the description of embodiments or the related art will be introduced briefly in the following. The drawings in the following description are some embodiments of the present disclosure.

DESCRIPTION OF EMBODIMENTS

In the present disclosure, the term "and/or" describes an association relationship of associated objects, and means that there may be three relationships. For example, "A and/or B" may represent three situations, namely, A exists alone, A and B exist at the same time, and B exists alone. The character "/" generally means that the associated objects before and after the character is of an "or" relationship.

The term "multiple" in embodiments of the present disclosure refers to two or more than two, and other quantifiers are similar to it.

The embodiments of the present disclosure will be described clearly and comprehensively in combination with accompanying drawings in the embodiments of the present disclosure. Obviously, the described embodiments are only part of the embodiments of the present disclosure, not all of them.

The embodiments of the present disclosure provide a terminal device locating method, an apparatus and a storage medium, which are used in any application scenario where a location of a terminal device needs to be determined, such as navigation, ranging, locating a calling user based on an emergency call or locating other authorized users based on a user request, and the like.

The embodiments of the present disclosure can be applied to various systems, especially a 5G system. For example, an applicable system may be a global system of mobile communication ( ) system, a code division multiple access (CDMA) system, a wideband code division multiple access (WCDMA) general packet radio service (GPRS) system, a long term evolution (LTE) system, an LTE frequency division duplex (FDD) system, an LTE time division duplex (TDD) system, a long term evolution advanced (LTE-A) system, a universal mobile telecommunication system (UMTS), a worldwide interoperability for microwave access (WiMAX) system, a 5G new radio (NR) system, etc. Each of the various systems includes a terminal device and a network device. The system may also include a core network part, such as an evolved packet system (EPS), a 5G system (5GS), etc.

Figures 1, 2:
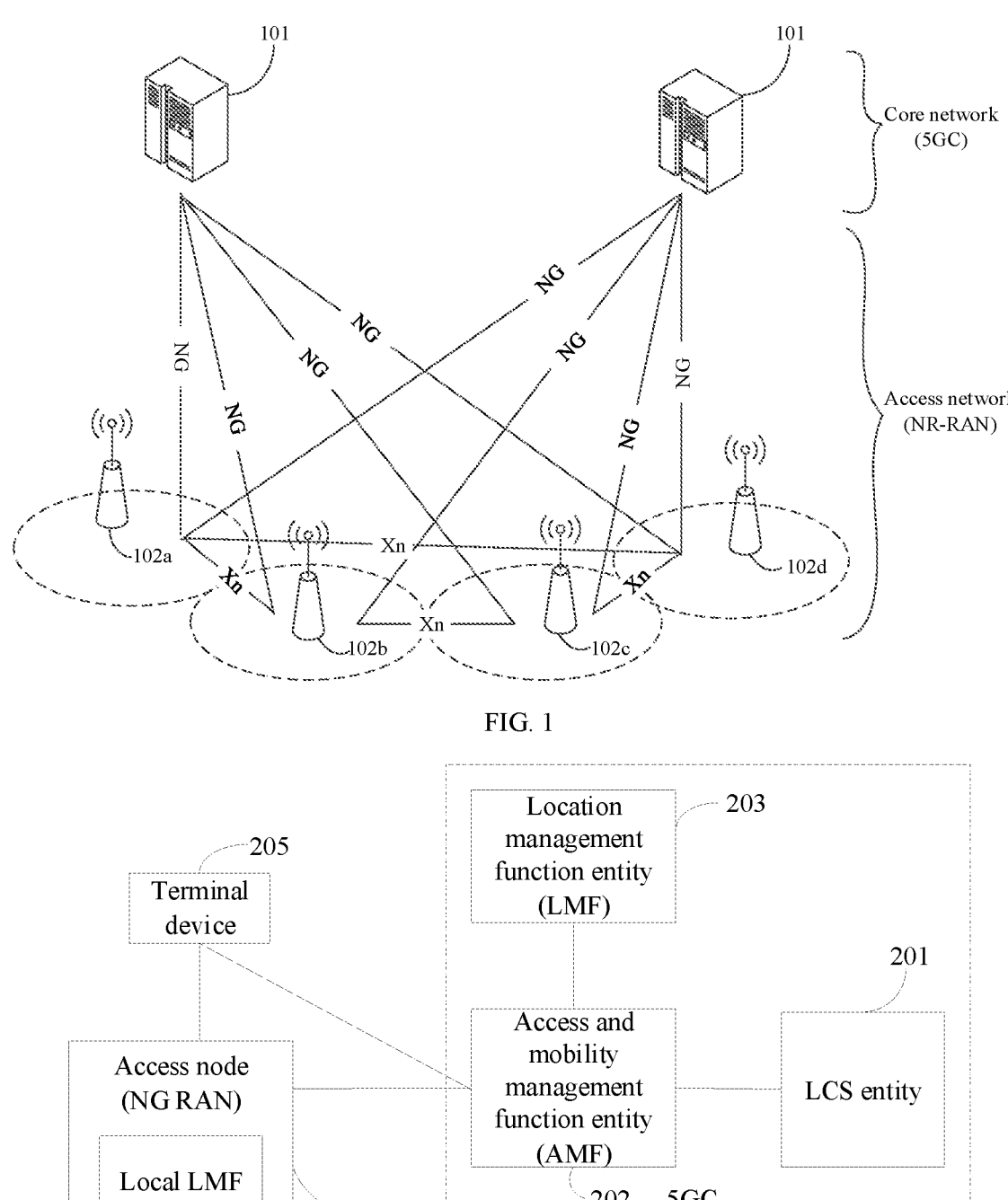
FIG. 1 is a schematic structural diagram of a 5G communication system to which embodiments of the present disclosure apply.
FIG. 2 is a schematic structural diagram of a location service network in a 5G network to which embodiments of the present disclosure apply.

FIG. 1 is a schematic structural diagram of a 5G communication system to which embodiments of the present disclosure apply. As shown in FIG. 1, a 5G communication system includes 5G core (5GC) network elements 101 and radio access network (Next Generation Radio Access Network, NG-RAN) network elements, and a 5GC network element 101 is connected with an NG-RAN network element through an NG port.

The network elements forming the 5GC 101 include an access and mobility management function (AMF) used to support control plane functions such as access and mobility management, a location server used to provide location services, such as a core network location management function (CN LMF), and a user plane function (UPF) used to support user plane functions (not shown in the figure).

The network elements forming the NG-RAN include RAN nodes (102a-102d as shown in the figure). The RAN nodes include network devices, such as a gNB providing a 5G network user with user plane and control plane protocols and functions of a wireless network, or an ng-eNB providing a 4G network user with user plane and control plane protocols and functions of a wireless network. On an access network side, an Xn port is used for connection between the gNB and the ng-eNB, between the gNB and the gNB, and between the ng-eNB and the ng-eNB, that is, the RAN nodes in an access network are connected through the Xn port. It should be noted that in the following description, an AMF entity is referred to as AMF for short, and an LMF entity is referred to as LMF for short.

An RAN node includes a serving base station of a terminal device and an adjacent station of the terminal device. For example, if the terminal device is in a cell covered by gNB 102a, gNB 102a is the serving base station of the terminal device and gNB 102b is the adjacent station of the terminal device.

It should be noted that the above architecture is described by taking the 5G system architecture as an example. The embodiments of the present disclosure may also be applied to a 5G evolution system, or to other communication systems (such as a 4G communication system), or to a system architecture of hybrid networking of a 5G system and other communication systems (such as a 4G system), and so on, which are not listed here. For example, in a 4G communication system or in a hybrid networking system of a 4G communication system and a 5G communication system, mobility management can be implemented by a mobility management entity (MME).

Based on the above system structure, a CN LMF in a core network provides location services for terminal devices through RAN nodes under the cooperation of core network elements such as AMF or MME.

FIG. 2 is a schematic structural diagram of a location service network in a 5G network to which embodiments of the present disclosure apply, and some network elements related to the embodiments of the present disclosure are illustratively enumerated in this diagram. As shown in FIG. 2, an LMF includes a core network LMF (as shown in an LMF 203) and a local LMF (LLMF) disposed on an access network side. There is an association between the local LMF and RAN nodes, for example, one local LMF may correspond to one or more RAN nodes. The local LMF may be co-located with a RAN node, and the local LMF is associated with the RAN node that it is co-located with (as shown in the figure, a local LMF (LLMF) 206 is co-located with a RAN node 204).

Based on the above system architecture, a location service process of a terminal device may include: an LCS entity 201 initiates a location service request to an AMF 202; the AMF 202 selects, according to network configuration and relevant information of a terminal device 205, an LMF that provides a location service for the terminal device 205. If the AMF 202 selects the LMF 203 to provide the location service for the terminal device 205, the location service request is initiated to the LMF 203; if the AMF selects the LLMF 206 co-located with the RAN node 204 (i.e., the serving RAN node) where the terminal device 205 resides to provide the location service for the terminal device 205, the location service request is initiated to the LLMF 206 co-located with the RAN node 204. The LMF 203 or the LLMF 206 obtains location information of the terminal device 205 by interacting with the AMF 202, the RAN node 204 and the terminal device 205, and sends location service response information to the LCS entity 201 through the AMF 202. Therefore, the determination of the location information of the terminal device can be completed.

The terminal device involved in the embodiments of the present disclosure may refer to a device that provides voice and/or data connectivity to a user, a handheld device with a wireless connection function, or other processing devices connected to a wireless modem, etc. The name of the terminal device may be different in different systems. For example, in the 5G system, the terminal device may be called a user equipment (UE). A wireless terminal device may communicate with one or more core networks (CNs) via a radio access network (RAN). The wireless terminal device may be a mobile terminal device, such as a mobile phone (or "cellular" phone) and a computer with a mobile terminal device. For example, the mobile terminal device may be portable, pocket-sized, handheld, computer-built or vehicle-mounted mobile apparatuses, which exchange voice and/or data with the radio access network, such as a personal communication service (PCS) phone, a cordless phone, a session initiated protocol (SIP) phone, a wireless local loop (WLL) station, a personal digital assistant (PDA) and other devices. The wireless terminal device may also be called a system, a subscriber unit, a subscriber station, a mobile station, a mobile, a remote station, an access point, a remote terminal, an access terminal, a user terminal device, a user agent, a user device, which is not limited in the embodiments of the present disclosure.

The network device involved in the embodiments of the present disclosure may be a base station, and the base station may include multiple cells providing services for terminals. Depending on a specific application, the base station may also be called an access point, or a device in an access network that communicates with a wireless terminal device through one or more sectors over an air interface, or other names. The network device may be configured to exchange a received over-the-air frame with an Internet protocol (IP) packet, and act as a router between the wireless terminal device and the rest of the access network, where the rest of the access network may include an Internet protocol (IP) communication network. The network device may also coordinate property management of the air interface. For example, the network device involved in the embodiments of the present disclosure may be a network device (Base Transceiver Station, BTS) in a global system for mobile communications (GSM) or code division multiple access (CDMA); may also be a network device (NodeB) in wideband code division multiple access (WCDMA); may also be an evolutional network device (evolutional Node B, eNB or e-NodeB) in a long term evolution (LTE) system, a 5G base station (gNB) in a 5G network architecture (next generation system); and may also be a home evolved base station (Home evolved Node B, HeNB), a relay node, a home base station (femto), a pico base station (pico), etc., which is not limited in the embodiments of the present disclosure. In some network structures, the network device may include a centralized unit (CU) node and a distributed unit (DU) node, and the centralized unit and distributed unit may also be geographically separated.

One or more antennas may be used by the network device and the terminal device respectively for multi input multi output (MIMO) transmission therebetween, and the MIMO transmission may be single user MIMO (SU-MIMO) or multiple user MIMO (MU-MIMO). Depending on the morphology and number of root antenna combinations, the MIMO transmission may be 2D-MIMO, 3D-MIMO, FD-MIMO or massive-MIMO, and may also be diversity transmission or precoding transmission or beamforming transmission, etc.

The location server involved in the embodiments of the present disclosure may be a network element with a location function in the core network, for example, an LMF, or a network element with a location function in the access network, for example, an access network device with a location function. The LMF can be deployed in the core network, that is, the LMF also belongs to a core network element. The LMF can communicate with an access network device, such as the access node NG RAN, via the AMF. For ease of description, in the embodiments of the present disclosure, sending information from the LMF to the access network device via the AMF is referred to as sending information from the LMF to the access network device. In other words, the LMF sending information to the access network device in the embodiments of the present can be understood as that the LMF first sends the information to the AMF, and the AMF then forwards the information to the access network device.

In addition, the LMF may also communicate with a terminal device. For example, the LMF may communicate with the terminal device through an LTE positioning protocol (LPP).

At present, various methods of locating a terminal device by measuring a reference signal in a 3GPP wireless communication system are defined in 3GPP, such as DL-TDOA, UL-TDOA and so on. A transmitting end will send a known reference signal, and the reference signal has a pseudo-random sequence with good autocorrelation. A receiving end utilizes characteristics of the pseudo-random sequence to perform time of arrival TOA measurement by adopting a cross-correlation method, to determine a location of a terminal device. In this method, since the TOA measurement is performed based on the sent reference signal, the measurement accuracy of a measurement result is limited by a length of the reference signal, a system bandwidth or a sampling rate of the receiving end, which may lead to lower measurement accuracy of the measurement result and lower accuracy of a location result of the terminal device. Taking the sampling rate as an example, it should be understood that the sampling rate of the receiving end is usually fixed. Due to a limitation of the sampling rate of the receiving end, only a TOA value $[\dot{\tau}_1]$ that is an integer multiple of a sampling interval can be estimated when using the cross-correlation method for TOA measurement. Therefore, compared with an actual propagation delay $\dot{\tau}_1$, the estimated TOA value $[\dot{\tau}_1]$ has a measurement error $\dot{\tau}_1-[\dot{\tau}_1]$, where $[\dot{\tau}_1]$ represents a rounding value of $\dot{\tau}_1$, and $\dot{\tau}_1$ is a propagation delay of a signal between the terminal device and a network device. In addition, when the sampling rate of the receiving end is constant, the length of the reference signal is 1/sampling rate. It should be understood that the system bandwidth is equivalent to the signal length, for example, the signal length is 2048 when the bandwidth is 20 Mhz, and the signal length is 4096 when the bandwidth is 50 Mhz, etc. Therefore, based on the influence of the above sampling rate on the accuracy of the measurement result, it can be seen that the signal bandwidth and the signal length also have the same influence on the accuracy of the measurement result.

In addition, in the related art, since a line-of-sight signal and a reflection path signal exist when sending a reference signal, a time-domain channel response corresponding to the reference signal includes carrier phase information corresponding to the line-of-sight signal and carrier phase information corresponding to the reflection path signal. Since a propagation delay from a terminal device to a network device is superimposed on the reference signal in a phase rotation mode, the carrier phase information corresponding to the line-of-sight signal cannot be correctly extracted at present due to such superimposing manner, and thus the terminal device cannot be located according to the carrier phase information corresponding to the line-of-sight signal. In addition, at present, the terminal device is usually located by means of a carrier phase difference in a single-path environment, but a TOA value determined by means of the carrier phase difference is a TOA estimation value $[\dot{\tau}_1]$ limited by the sampling rate, so the current locating method is not suitable for a multi-path environment, and the locating accuracy is also relatively low.

Considering the above problems, an embodiment of the present disclosure provides a terminal device locating method. In this method, a line-of-sight time-domain signal can be obtained by performing filtering processing on a time-domain channel response of a reference signal, and thus a multipath effect can be eliminated. According to the obtained line-of-sight time-domain signal, subcarrier phase information of a line-of-sight frequency-domain signal corresponding to the line-of-sight time-domain signal can be directly extracted, and a propagation delay $\dot{\tau}_1$ of a signal between the terminal device and the network device is determined according to the subcarrier phase information. The propagation delay $\dot{\tau}_1$ determined in this way is not rounded, that is, the propagation delay is not affected by the sampling rate. Therefore, the accuracy of the determined TOA value is higher, and thus the accuracy of a measurement value of a distance between the terminal device and the network device is also higher, to improve the accuracy of locating the terminal device.

Methods and the apparatuses are based on a same application concept. Since the principles of the methods and the apparatuses to solve the problems are similar, the implementation of the apparatuses and the methods can be referred to for each other, and the repetition is not repeated here.

Figure 3:
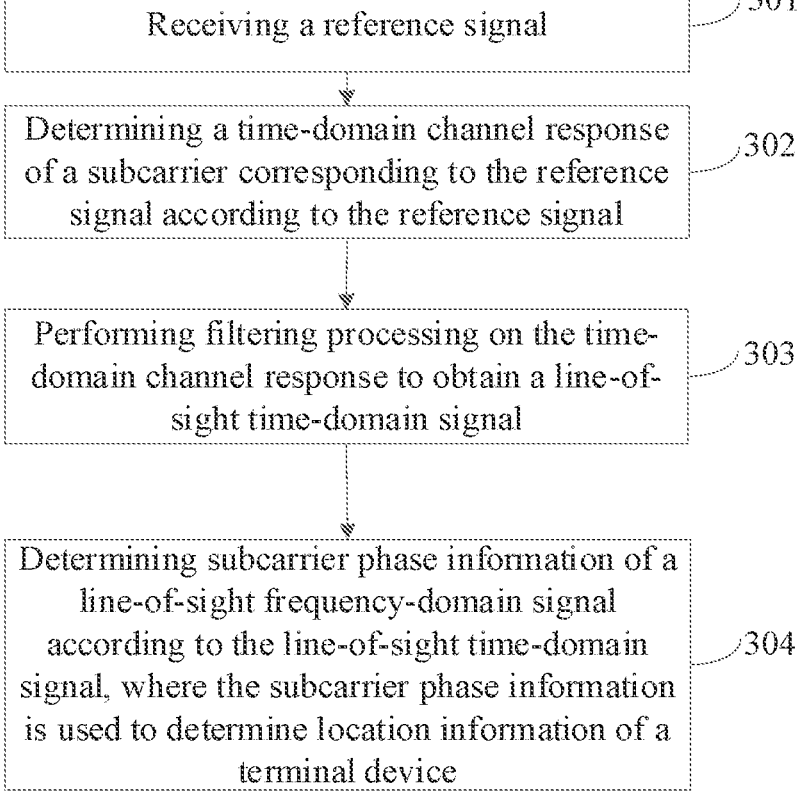
FIG. 3 is a schematic flowchart of a terminal device locating method provided by an embodiment of the present disclosure.

FIG. 3 is a schematic flowchart of a terminal device locating method provided by an embodiment of the present disclosure, where the method may be executed by a first network element, and the first network element may be a terminal device and/or a network device. As shown in FIG. 3, the method includes the following steps.

Step 301: receiving a reference signal.

In this step, the reference signal may include a positioning reference signal (PRS) and/or a sounding reference signal (SRS). If the locating method is an uplink locating method, the first network element is a network device, that is, a terminal device will send an SRS to the network device. If the locating method is a downlink locating method, the first network element is a terminal device, that is, a network device will send a PRS to the terminal device. If the locating method is an uplink locating method and a downlink locating method, the first network element is a network device and a terminal device, that is, the terminal device will send an SRS to the network device, and at the same time, the network device will send a PRS to the terminal device.

Step 302: determining a time-domain channel response of the reference signal according to the reference signal.

In this step, after receiving the reference signal, the first network element determines the time-domain channel response of the reference signal. In a possible implementation, a frequency-domain channel response of a subcarrier corresponding to the reference signal can be determined according to the reference signal, and then the time-domain channel response can be determined according to the frequency-domain channel response.

In one embodiment, assuming that $X^m$ is a frequency-domain reference signal of the m-th orthogonal frequency division multiplexing (OFDM) symbol, and $Y^m$ is the m-th OFDM symbol received by a receiving end device, then the frequency-domain channel response based on the least square criterion can be expressed as the following Formula (1):

$$H^m(k) = Y^m(k)/X^m(k) = \sum_{l=L}^{L_p} h_l e^{-j2\pi\frac{k-1}{N}\dot{\tau}_l - j\phi_l} + w_k^m, k = 1, 2 \ldots, N, \quad (1)$$

where $H^m(k)$ represents a frequency-domain channel response of the k-th subcarrier in the m-th OFDM symbol, $Y^m(k)$ represents the k-th subcarrier in the m-th OFDM symbol received by the receiving end device, $X^m(k)$ represents a frequency-domain reference signal corresponding to the k-th subcarrier in the m-th OFDM symbol, $L_p$ represents a total number of reference signal transmission paths, l=1 represents a line-of-sight signal and the rest are reflection path signals. $h_l$ represents an attenuation caused on the l-th reference signal transmission path by a channel, N is a length of Fourier transform, that is, a length of a sent reference signal. $\dot{\tau}_l = N\Delta f_{SCS}\tau_l$ represents a propagation delay of the l-th reference signal transmission path in a unit of sampling points, where $\tau_l$ represents the propagation delay of the l-th reference signal transmission path in a unit of seconds, $\Delta f_{SCS}$ is a sampling interval of an OFDM system. $\phi_l = 2\pi f_c \tau_l$ represents a phase rotation of a signal due to spatial propagation, $\phi_1 = 2\pi f_c \tau_1$ represents a phase rotation of the reference signal caused by a line of sight (line of sight, LOS) path propagation, where fc is a frequency corresponding to the lowest point subcarrier, and a subcarrier is 0 to N.

Due to the influence of multipath effect, it is usually impossible to directly extract phase information of a line-of-sight from the frequency-domain channel response, so the frequency-domain channel response needs to be transformed into a time domain for further processing. Moreover, if a first path transmission delay $\dot{\tau}_1$ is not an integer multiple of the sampling interval, the time-domain channel response can be expressed as Formula (2):

$$h^m[n] = \frac{\sin(\pi\dot{\tau}_l)}{\sqrt{N}\sin\left(\frac{\pi}{N}(\dot{\tau}_l - n)\right)} \sum_{l=1}^{L_p} h_l e^{-j\frac{\pi}{N}(n+(N-1)\dot{\tau}_l) - j\phi_l}, \quad (2)$$

where $h^m[n]$ represents a time-domain channel response of the m-th OFDM symbol at the n-th time-domain sampling point.

In this embodiment, by determining the frequency-domain channel response of the subcarrier corresponding to the reference signal and determining the time-domain channel response according to the frequency-domain channel response, it can be ensured that the subcarrier phase information can be extracted from the time-domain channel response, to determine the location information of the terminal device according to the extracted subcarrier phase information, to improve the accuracy of the determined location information of the terminal device.

Based on pseudo-randomness of a sent positioning reference signal, time-domain cross-correlation can be performed to estimate a TOA in a multipath environment, in which a TOA estimation solution of the time-domain cross-correlation has low computational complexity and is a commonly used measurement method in wireless cellular networks at present. However, due to a limitation of a system sampling rate, the cross-correlation method can only estimate a TOA value $[\hat{\tau}_1]$ that is an integer multiple of the sampling interval, so there is a measurement error $\hat{\tau}_1 - [\hat{\tau}_1]$ compared with an actual propagation delay $\hat{\tau}_1$, where [*] represents rounding a number in parentheses. Therefore, in order to reduce the measurement error, in the present disclosure, the subcarrier phase information can be extracted from the line-of-sight time-domain signal after performing filtering processing on the time-domain channel response, to directly obtain the actual propagation delay $\hat{\tau}_1$. A specific processing process can be described with reference to the following.

Step 303: performing filtering processing on the time-domain channel response to obtain a line-of-sight time-domain signal.

In this step, assuming that the receiving end device has obtained $[\hat{\tau}_1]$ which is closest to the true propagation delay $\hat{\tau}_1$ by using the cross-correlation method or a super-resolution algorithm such as MUSIC (Multiple Signal Classification), then it can be considered to design a time-domain filter to remove the multipath effect in the channel, that is, the reflection path signal can be filtered out by the time-domain filter, and only the line-of-sight time-domain signal can be obtained. In addition, the time-domain filter can also remove noise of the received signal at other sampling points, so the frequency-domain signal-to-noise ratio is also improved. Therefore, in a possible implementation, filtering processing can be performed on the time-domain channel response according to a preset time-domain filter, to obtain the line-of-sight time-domain signal. It should be understood that the above-mentioned time-domain filter may be implemented in various ways, such as a rectangular window, a triangular window, a raised cosine window, a Hamming window, etc. Different window functions are different for time-domain filtering, and the length of the filter is described as $F([\hat{\tau}_1])$, that is, a function of $[\hat{\tau}_1]$. In one embodiment, the function can directly be $[\hat{\tau}_1]$. In the present disclosure, a rectangular-window-based time-domain filter is taken as an example for illustration. For other kinds of time-domain filters, the implementation principles and effects are similar to the rectangular-window-based time-domain filter, and will not be repeated here. Time-domain processing based on the rectangular window is shown in Formula (3):

$$h_{ic}^m[n] = \begin{cases} h^m[n], & n = [\hat{\tau}_1] \\ 0, & \text{otherwise} \end{cases}, \qquad (3)$$

where $$h_{ic}^m[n]$$

represents the line-of-sight time-domain signal obtained after rectangular window processing.

In this embodiment, filtering processing can be performed on the time-domain signal response through the preset time-domain filter, and not only the multipath effect in the channel can be removed to obtain the line-of-sight time-domain signal, but also the noise of the received signal at other sampling points can be removed, to improve the frequency-domain signal-to-noise ratio.

Step 304: determining subcarrier phase information of a line-of-sight frequency-domain signal according to the line-of-sight time-domain signal, where the subcarrier phase information is used to determine the location information of the terminal device.

In a possible implementation, the line-of-sight time-domain signal can be converted into a frequency-domain signal through Fourier transform; according to an index of a subcarrier corresponding to the frequency-domain signal, a frequency-domain channel response of the subcarrier can be determined, and the subcarrier phase information can be extracted from the frequency-domain channel response.

In one embodiment, Fourier transform is performed on the line-of-sight time-domain signal $$h_{ic}^m[n]$$

which is obtained after the processing by the filter to obtain the frequency-domain signal, and the frequency-domain channel response of the subcarrier is determined according to the index of the subcarrier corresponding to the frequency-domain signal, as shown in Formula (4):

$$H_k^m = \frac{h_1 \sin(\pi \hat{\tau}_1) e^{-j\frac{\pi}{N}([\hat{\tau}_1] + (N-1)\hat{\tau}_1) - j\phi_1 - j2\pi \frac{[\hat{\tau}_1]}{N}k}}{\sqrt{N} \sin\left(\frac{\pi}{N}(\hat{\tau}_1 - [\hat{\tau}_1])\right)}, \qquad (4)$$

where $$H_k^m$$

represents a frequency-domain channel response of the k-th subcarrier in the m-th OFDM symbol after the rectangular window processing, $h_1$ represents an attenuation caused on the 1st reference signal transmission path by the channel, that is, an attenuation caused by a transmission path of a line-of-sight signal, and k is the index of the subcarrier.

After the frequency-domain channel response is determined, the subcarrier phase information can be extracted from the frequency-domain channel response, to determine the location information of the terminal device according to the extracted subcarrier phase information.

Exemplarily, it can be seen from Formula (4) that the subcarrier phase information of the frequency-domain channel response includes an unprocessed signal propagation delay $\hat{\tau}_1$, so $\hat{\tau}_1$ can be obtained by extracting the subcarrier phase information. Determining the location information of the terminal device based on the unprocessed $\hat{\tau}_1$ can improve the accuracy of the determined location information.

In one embodiment, it can be seen from Formula (4) that a phase of the frequency-domain channel response is $$e^{-j\frac{\pi}{N}([\hat{\tau}_1] + (N-1)\hat{\tau}_1) - j\phi_1 - j2\pi \frac{[\hat{\tau}_1]}{N}k},$$

and the sign of $$\frac{\sin(\pi \hat{\tau}_1)}{\sin\left(\frac{\pi}{N}(\hat{\tau}_{1_1} - [\hat{\tau}_1])\right)}$$

will also affect the phase. In the following, these items will be analyzed in turn. For $$e^{-j\frac{\pi}{N}([\dot{\tau}_1]+(N-1)\dot{\tau}_1)},$$

because $[\dot{\tau}_1] \approx \dot{\tau}_1 \pm 0.5$ and $$\frac{\pm 0.5}{N} \ll 1,$$

based on this, the following approximation $$e^{-j\frac{\pi}{N}([\dot{\tau}_1]+(N-1)\dot{\tau}_1)} \approx e^{-j2\pi\dot{\tau}_1}$$

can be made, then a phase of $$H_k^m$$

can be expressed as Formula (5):

$$
\begin{cases}
-\pi\dot{\tau}_1 - \phi_1 - 2\pi k\dfrac{[\dot{\tau}_1]}{N}, \text{ if } \dfrac{\sin(\pi\dot{\tau}_1)}{\sin\left(\dfrac{\dot{\tau}}{N}(\dot{\tau}_{1_1} - [\dot{\tau}_1])\right)} \ge 0 \\[6mm]
-\pi\dot{\tau}_1 - \phi_1 - 2\pi k\dfrac{[\dot{\tau}_1]}{N} - j\pi, \text{ if } \dfrac{\sin(\pi\dot{\tau}_1)}{\sin\left(\dfrac{\dot{\tau}}{N}(\dot{\tau}_{1_1} - [\dot{\tau}_1])\right)} < 0
\end{cases}, \quad (5)
$$

where $\dot{\tau}_1$ has four different value ranges, and according to the different value ranges, the sign of $$\frac{\sin(\pi\dot{\tau}_1)}{\sin\left(\dfrac{\pi}{N}(\dot{\tau}_{1_1} - [\dot{\tau}_1])\right)}$$

is not the same. Table 1 shows values of signs of $$\frac{\sin(\pi\dot{\tau}_1)}{\sin\left(\dfrac{\pi}{N}(\dot{\tau}_{1_1} - [\dot{\tau}_1])\right)}$$

in different value ranges, where ñ represents an integer closest to $\dot{\tau}_1$.

TABLE 1

| | $\sin(\pi\dot{\tau}_1)$ | $\dot{\tau}_1 - [\dot{\tau}_1]$ | $\dfrac{\sin(\pi\dot{\tau}_1)}{\sin\left(\dfrac{\pi}{N}(\dot{\tau}_1 - [\dot{\tau}_1])\right)}$ |
|---|---|---|---|
| $2\tilde{n} - 0.5 \le \dot{\tau}_1 \le 2\tilde{n}$ | $\le 0$ | $< 0$ | $\ge 0$ |
| $2\tilde{n} \le \dot{\tau}_1 \le 2\tilde{n} + 0.5$ | $\ge 0$ | $> 0$ | $\ge 0$ |
| $2\tilde{n} + 0.5 \le \dot{\tau}_1 \le 2\tilde{n} + 1$ | $\ge 0$ | $< 0$ | $\le 0$ |
| $2\tilde{n} + 1 \le \dot{\tau}_1 \le 2\tilde{n} + 1.5$ | $\le 0$ | $> 0$ | $\le 0$ |

As can be seen from Table 1, when $[\dot{\tau}_1]$ is an even number, i.e., $[\dot{\tau}_1] = 2\tilde{n}$, then $$\frac{\sin(\pi\dot{\tau}_1)}{\sin\left(\dfrac{\pi}{N}(\dot{\tau}_1 - [\dot{\tau}_1])\right)} \ge 0.$$

Similarly, when $[\dot{\tau}_1]$ is an odd number, i.e., $[\dot{\tau}_1] = 2\tilde{n}+1$ then $$\frac{\sin(\pi\dot{\tau}_1)}{\sin\left(\dfrac{\pi}{N}(\dot{\tau}_1 - [\dot{\tau}_1])\right)} \le 0.$$

Based on this, Formula (5) can be further expressed in a form of Formula (6):

$$
\begin{cases}
-\pi\dot{\tau}_1 - \phi_1 - 2\pi k\dfrac{[\dot{\tau}_1]}{N}, \text{ if } [\dot{\tau}_1] = 2\tilde{n} \\[4mm]
-\pi\dot{\tau}_1 - \phi_1 - 2\pi k\dfrac{[\dot{\tau}_1]}{N} - \pi, \text{ if } [\dot{\tau}_1] = 2\tilde{n}+1
\end{cases}, \quad (6)
$$

Formula (6) can be simplified to Formula (7) when $k=N/2$ is taken as the subcarrier index number:

$$
\begin{cases}
-\pi\dot{\tau}_1 - \phi_1 - \pi[\dot{\tau}_1], \text{ if } [\dot{\tau}_1] = 2\tilde{n} \\
-\pi\dot{\tau}_1 - \phi_1 - \pi[\dot{\tau}_1] - \pi, \text{ if } [\dot{\tau}_1] = 2\tilde{n}+1
\end{cases}, \quad (7)
$$

Therefore, when the subcarrier index number is k N/2, whether $[\dot{\tau}_1]$ is an odd number or an even number, the phase of the frequency-domain channel response processed by the time-domain filter is always $-j\pi\tau_1 - j\phi_1$. Moreover, when the subcarrier index number is $k=N/2$, phase information can be expressed as the following Formula (8):

$$\hat{\phi} = -\text{angle}\left(H_{k=N/2}^m\right) \quad 0 \le \hat{\phi} \le 2\pi. \quad (8)$$

where $\hat{\phi}$ represents the subcarrier phase information, and the operator angle(*) represents taking an angle of a complex number in parentheses.

Therefore, according to Formula (4) and Formula (8), the subcarrier phase information $\hat{\phi}$ can be extracted from the frequency-domain signal.

It is worth noting that a subcarrier phase measurement of a OFDM system is a phase measurement of an actual frequency corresponding to any subcarrier concerned by a subcarrier phase measurement algorithm loop of the OFDM system, that is, in the embodiment of the present disclosure, k may also take any other value, such as 0, 1, . . . N. In the embodiment of the present disclosure, only the phase information at $k=N/2$ is taken as an example. When k takes other values, the manner of extracting the phase information is similar to that of extracting the phase information when $k=N/2$, and will not be repeated here. In addition, it should be understood that an error of the phase information extracted when $k=N/2$ is the smallest.

In this embodiment, the line-of-sight time-domain signal can be converted into the frequency-domain signal through Fourier transform, and the frequency-domain channel response of the subcarrier is determined according to the index of the subcarrier corresponding to the frequency-domain signal. Then the subcarrier phase information is extracted from the frequency-domain channel response. In this way, the subcarrier phase information of the line-of-sight frequency-domain signal can be extracted, to ensure the accuracy of the determined location information of the terminal device.

Exemplarily, if a UE direct (UE base) locating method of the downlink locating method is adopted, that is, when the first network element is the terminal device, the terminal device will determine the location information of the terminal device according to the subcarrier phase information.

In one embodiment, when extracting the subcarrier phase information according to Formula (8), the obtained subcarrier phase information $\hat{\phi}$ satisfies $0 \le \hat{\phi} \le 2\pi$ due to characteristics of an inverse trigonometric function, so there may be an unknown deviation of an integer multiple of $2\pi$ between the obtained subcarrier phase information $\hat{\phi}$ and the actual phase. For ease of description, the deviation can be called an integer ambiguity.

Therefore, in order to improve the accuracy of the determined location information of the terminal device, the integer ambiguity needs to be considered when determining the location information of the terminal device according to the subcarrier phase information. Exemplarily, an integer ambiguity of a distance between the terminal device and the network device can be determined according to the subcarrier phase information; a measurement distance between the terminal device and the network device can be determined according to the subcarrier phase information and the integer ambiguity; and the location information of the terminal device can be determined according to the measurement distance between the terminal device and the network device.

In one embodiment, considering $\dot{\tau}_l = N \Delta f_{SCS} \tau_l$ and $\phi_1 = 2\pi f_c \tau_1$, if the integer ambiguity $N_l$ and a phase deviation $w_P$ caused by noise are taken into account, a measurement formula based on a subcarrier phase can be expressed as the following Formula (9):

$$\begin{aligned} \hat{\phi} &= \pi N \Delta f_{SCS} \tau_1 + 2\pi f_c \tau_1 - 2\pi N_l + w_P \\ &= \frac{2\pi c \tau_1}{\lambda} - 2\pi N_l + w_P \end{aligned} \quad (9)$$

where c represents a speed of light in vacuum, $$\lambda = \frac{c}{f_c + \frac{N}{2}\Delta f_{SCS}}.$$

represents a wavelength, where $f_c$ is a frequency corresponding to the lowest subcarrier, and a subcarrier is 0 to N.

Further, if both sides of Formula (9) are divided by $2\pi$ simultaneously, then Formula (10) can be obtained:

$$\phi_r^i = \frac{d_r^i}{\lambda} - N_r^i + w_{r,P}^j, \quad (10)$$

where $$\phi_r^i = \frac{\hat{\phi}_r^i}{2\pi}$$

and $$0 \le \phi_r^i \le 1, \hat{\phi}_r^i$$

represents a subcarrier phase measurement value from the i-th network device to the r-th terminal device obtained by Formula (8), $$\phi_r^i$$

represents a value obtained after performing normalization processing on $$\hat{\phi}_r^i$$

$\lambda$ represents the wavelength, $$d_r^i$$

represents a measurement distance between the i-th network device and the r-th terminal device, $$N_r^i$$

represents an integer ambiguity of a distance between the i-th network device and the r-th terminal device, and $$w_{r,P}^j$$

is a phase noise.

In one embodiment, the value of the phase noise $$w_{r,P}^j$$

is very small and may be ignored in actual calculation. Therefore, Formula (10) can be expressed as the following Formula (11):

$$d_r^i = \lambda\left(\phi_r^i + N_r^i\right). \quad (11)$$

Therefore, it can be known from Formula (11) that, when determining the measurement distance $$d_r^i$$

between the i-th network device and the r-th terminal device, the integer ambiguity $$N_r^i$$

of the distance between the i-th network device and the r-th terminal device needs to be determined first.

In a possible implementation, a TOA measurement value can be used to estimate the integer ambiguity. Exemplarily, the TOA measurement value between the terminal device and the network device can be acquired, and the integer ambiguity can be determined according to the subcarrier phase information and the TOA measurement value.

In one embodiment, a TOA measurement value $$T_r^i$$

between the i-th network device and the r-th terminal device can be expressed by the following Formula (12):

$$T_r^i = d_r^i + w_{r,T}^i, \qquad (12)$$

where $$w_{r,T}^i$$

represents a measurement noise of TOA.

Combining Formula (10) and Formula (12), the following Formula (13) can be obtained:

$$N_r^i = \frac{T_r^i - w_{r,T}^i}{\lambda} - \phi_r^i + w_{r,P}^i. \qquad (13)$$

Since a value of $$w_{r,P}^i = \frac{w_{r,T}^i}{\lambda}$$

is small and can be ignored in an actual calculation process, the integer ambiguity $$N_r^i$$

can be approximately expressed as Formula (14):

$$N_r^i = \left[ \frac{T_r^i}{\lambda} - \phi_r^i \right], \qquad (14)$$

where [ ] represents a rounding operation. Because the integer ambiguity must be an integer, it is necessary to perform a rounding operation on $$\frac{T_r^i}{\lambda} - \phi_r^i$$

to obtain the integer ambiguity $$N_r^i.$$

$$T_r^i$$

and $$\phi_r^i$$

can be obtained directly by measurement, so in a specific implementation process, the integer ambiguity $$N_r^i$$

can be determined according to Formula (14).

In this embodiment, the integer ambiguity can be determined according to the subcarrier phase information and the TOA measurement value, and thus the location information of the terminal device can be determined according to the determined integer ambiguity. Since the integer ambiguity is considered, the locating accuracy can be improved.

After determining the integer ambiguity $$N_r^i$$

of the distance between the i-th network device and the r-th terminal device, since $$\phi_r^i$$

can be obtained directly by measurement, the measurement distance $$d_r^i$$

between the i-th network device and the r-th terminal device can be determined according to Formula (11).

In this embodiment, when determining the measurement distance between the network device and the terminal device, the integer ambiguity of the distance between the network device and the terminal device is considered, and the accuracy of the determined measurement distance can be higher.

In one embodiment, when determining the location information of the terminal device, the measurement distance between the terminal device and each of at least two network devices needs to be determined respectively according to the manner in the previous embodiments, to locate the terminal device according to the measurement distance between the terminal device and each network device.

In this embodiment, after the integer ambiguity of the distance is determined through the subcarrier phase information, the measurement distance between the terminal device and the network device can be determined based on the integer ambiguity and the subcarrier phase information, thus completing the terminal device locating. Since the measurement distance between the terminal device and the network device is determined based on the subcarrier phase information, that is, when there is a propagation delay of a signal between the terminal device and the network device, this propagation delay is not processed, the accuracy of the measurement distance between the terminal device and the network device is higher, and the accuracy of the terminal device locating is improved.

Exemplarily, if a UE assisted locating method of the downlink locating method is adopted, that is, when the first network element is the terminal device, the terminal device will send the determined subcarrier phase information to a location server, and the location server will determine the location information of the terminal device according to the received subcarrier phase information.

The way in which the location server determines the location information of the terminal device according to the subcarrier phase information is similar to the way in which the terminal device determines the location information of the terminal device according to the subcarrier phase information, and can be found in the description in previous embodiments, which will not be repeated here.

Exemplarily, if an uplink locating method is adopted, that is, when the first network element is a network device, the network device will send the determined subcarrier phase information to the location server, and the location server will determine the location information of the terminal device according to the received subcarrier phase information.

The way in which the location server determines the location information of the terminal device according to the subcarrier phase information is similar to the way in which the terminal device determines the location information of the terminal device according to the subcarrier phase information, and can be found in the description in previous embodiments, which will not be repeated here.

In summary, it can be seen from Formula (2) that due to the limitation of the system sampling rate, the cross-correlation method can only estimate the TOA value $[\dot{\tau}_1]$ that is an integer multiple of the sampling interval, while it can be seen from Formula (9) that the accuracy of the subcarrier phase measurement value $$\hat{\phi} = \frac{2\pi c t_1}{\lambda} - 2\pi N_l + w_P$$

is not related to the time-domain sampling rate but only related to $\tau_1$, and thus is not limited by the length of the sent reference signal/the system bandwidth/the sampling rate of the receiving end, and high-precision measurement information can be provided under limited bandwidth. In addition, compared with the cross-correlation method in the related art, in the present disclosure, after the time-domain channel response is obtained, the time-domain channel response will be windowed, and then the subcarrier phase information is extracted from the obtained frequency-domain signal. Therefore, compared with the cross-correlation method, the Fourier transform of only one signal length is added, and its complexity can be ignored. Therefore, the embodiments have the advantages of high measurement accuracy and low complexity.

In the terminal device locating method provided by the present disclosure, the time-domain channel response of the reference signal is determined according to the received reference signal; filtering processing is performed on the time-domain channel response to obtain the line-of-sight time-domain signal; and the subcarrier phase information of the line-of-sight frequency-domain signal corresponding to the line-of-sight time-domain signal is determined according to the line-of-sight time-domain signal, where the subcarrier phase information is used to determine the location information of the terminal device. Because the line-of-sight time-domain signal can be obtained by performing filtering processing on the time-domain channel response of the reference signal, the multipath effect can be eliminated. According to the obtained line-of-sight time-domain signal, the subcarrier phase information of the line-of-sight frequency-domain signal corresponding to the line-of-sight time-domain signal can be directly extracted, and the propagation delay of the reference signal can be determined according to the subcarrier phase information. Since the propagation delay determined according to the subcarrier phase information of the line-of-sight frequency-domain signal is not affected by the sampling rate, the accuracy of the propagation delay can be improved through the above manner, and thus the accuracy of the location information of the terminal device determined based on the propagation delay can be further improved.

In the following, solutions of the present disclosure are specifically illustrated by taking a measurement process of downlink subcarrier phase information and a measurement process of uplink subcarrier phase information as examples respectively.

Figure 4:
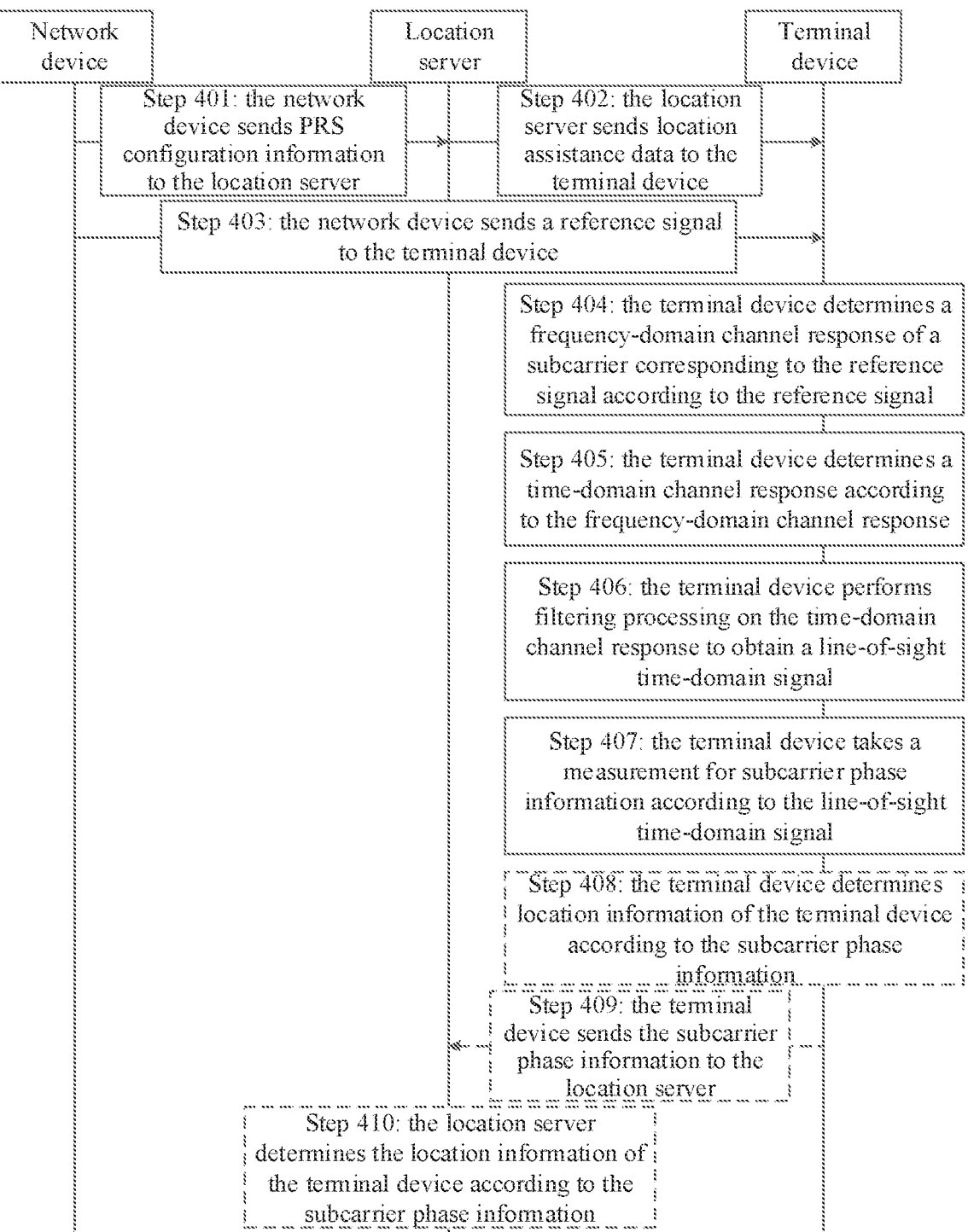
FIG. 4 is a schematic diagram of a measurement process of downlink subcarrier phase information provided by an embodiment of the present disclosure.

FIG. 4 is a schematic diagram of a measurement process of downlink subcarrier phase information provided by an embodiment of the present disclosure. As shown in FIG. 4, the method includes the following steps.

Step 401: a network device sends PRS configuration information to a location server.

The PRS configuration information includes PRS time-frequency resource information, PRS sequence information and Muting mechanism information, etc.

Step 402: the location server sends location assistance data to a terminal device.

The location assistance data includes the PRS configuration information.

Step 403: the network device sends a reference signal to the terminal device.

The network device will send the reference signal to the terminal device according to the PRS configuration information, and the reference signal includes a PRS positioning reference signal.

Step 404: the terminal device determines a frequency-domain channel response of a subcarrier corresponding to the reference signal according to the reference signal.

The terminal device receives the PRS positioning reference signal according to the PRS configuration information, and estimates the frequency-domain channel response by the PRS positioning reference signal.

Step 405: the terminal device determines a time-domain channel response according to the frequency-domain channel response.

Step 406: the terminal device performs filtering processing on the time-domain channel response to obtain a line-of-sight time-domain signal.

According to the time-domain channel response, the terminal device obtains an integer-multiple sampling point $[\dot{\tau}_1]$ closest to a true propagation delay $\dot{\tau}_1$ by using a cross-correlation algorithm, and designs a time-domain filter around the integer-multiple sampling point $[\dot{\tau}_1]$ to perform filtering processing on the time-domain channel response, to eliminate the influence of non-line-of-sight. For the time-domain filter, Formula (3) can be referred to.

Step 407: the terminal device measures subcarrier phase information according to the line-of-sight time-domain signal.

The terminal device performs Fourier transform (as shown in Formula (4)) on the line-of-sight time-domain signal subject to the filtering processing, and then performs a phase extraction operation on the N/2-th subcarrier (as shown in Formula (8)). After equivalent conversion or normalization processing (as shown in Formula (9)), a measurement value of the subcarrier phase information (as shown in Formula (10)) can be obtained.

According to different locating methods, the terminal device selectively performs the following steps 408 and 409.

Step 408: the terminal device determines location information of the terminal device according to the subcarrier phase information.

Exemplarily, if a UE direct (UE based) locating manner is adopted, the measurement value of the subcarrier phase information may be a subcarrier phase measurement value without being subject to differential processing or a subcarrier phase measurement subject to single-differential processing. The terminal device will determine the location information of the terminal device according to the subcarrier phase information. The terminal device may also combine other TOA/TDOA and angle of arrive (Angle of Arrive, AOA) information for joint locating.

Step 409: the terminal device sends the subcarrier phase information to the location server.

Step 410: the location server determines the location information of the terminal device according to the subcarrier phase information.

Exemplarily, if a UE assisted locating manner is adopted, the terminal device may report the measurement value of the subcarrier phase information to the location server, and the location server will determine the location information of the terminal device according to the subcarrier phase information. The location server may also combine other TOA/TDOA and AOA information for joint locating.

It should be understood that the embodiment shown in FIG. 4 only shows a process of locating the terminal device within one locating period. In a specific implementation process, it may also be applicable to multiple locating periods, to track a motion trajectory of the terminal device.

In the terminal device locating method provided by the present disclosure, the time-domain channel response of the reference signal is determined according to the received reference signal; filtering processing is performed on the time-domain channel response to obtain the line-of-sight time-domain signal; and the subcarrier phase information of the line-of-sight frequency-domain signal corresponding to the line-of-sight time-domain signal is determined according to the line-of-sight time-domain signal, where the subcarrier phase information is used to determine the location information of the terminal device. Because the line-of-sight time-domain signal can be obtained by performing filtering processing on the time-domain channel response of the reference signal, the multipath effect can be eliminated. According to the obtained line-of-sight time-domain signal, the subcarrier phase information of the line-of-sight frequency-domain signal corresponding to the line-of-sight time-domain signal can be directly extracted, and the propagation delay of the reference signal can be determined according to the subcarrier phase information. Since the propagation delay determined according to the subcarrier phase information of the line-of-sight frequency-domain signal is not affected by the sampling rate, the accuracy of the propagation delay can be improved through the above manner, and thus the accuracy of the location information of the terminal device determined based on the propagation delay can be further improved.

Figure 5:
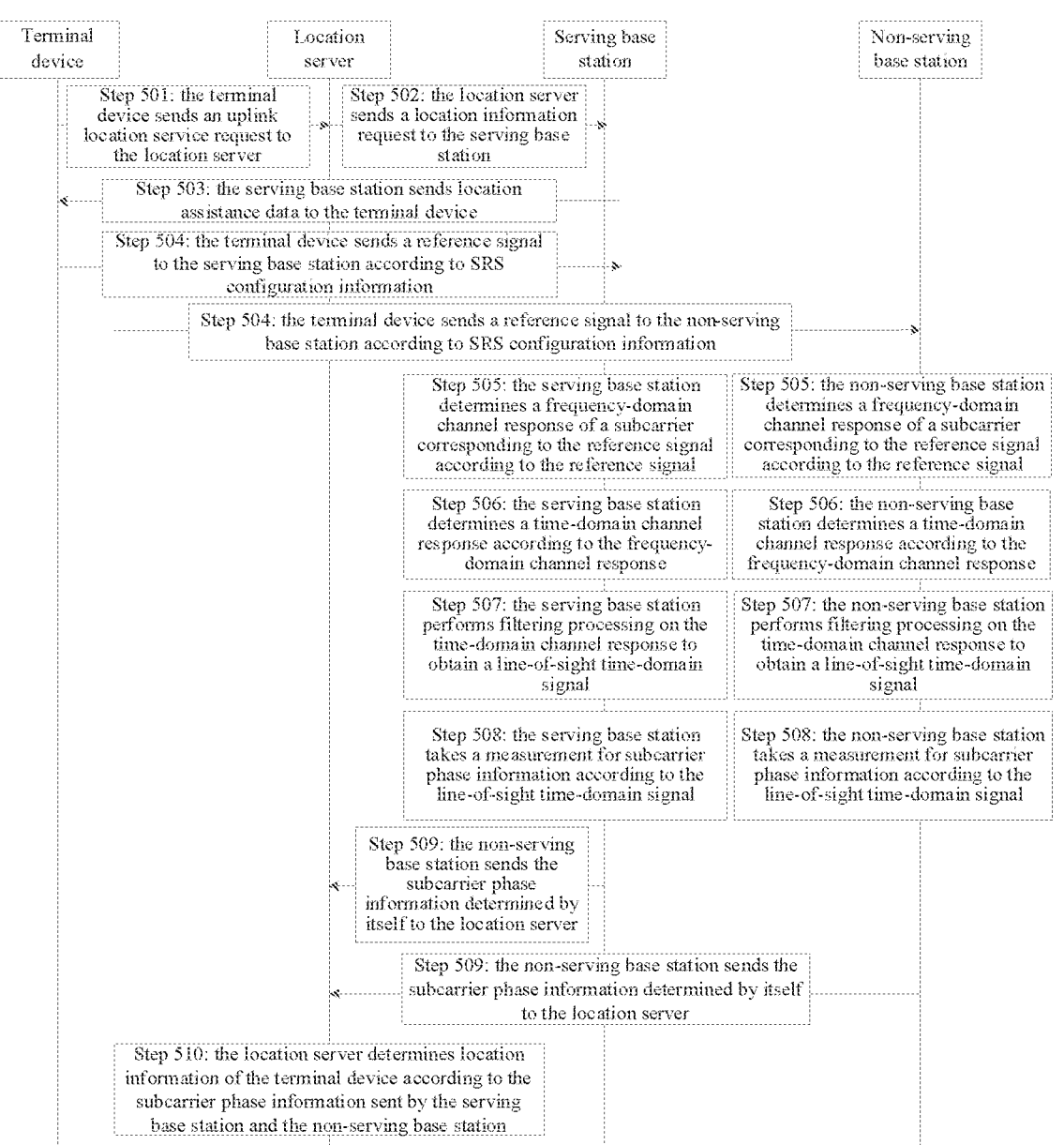
FIG. 5 is a schematic diagram of a measurement process of uplink subcarrier phase information provided by an embodiment of the present disclosure.

FIG. 5 is a schematic diagram of a measurement process of uplink subcarrier phase information provided by an embodiment of the present disclosure. As shown in FIG. 5, in an uplink-based locating method, a network device includes a serving base station and a non-serving base station. The method includes the following steps.

Step 501: a terminal device sends an uplink location service request to a location server.

The location server may be an LMF.

Step 502: the location server sends a location information request to the serving base station.

Step 503: the serving base station sends location assistance data to a terminal device.

The location assistance data includes SRS configuration information, and the SRS configuration information includes SRS time-frequency resource information, SRS sequence information and Muting mechanism information.

Step 504: the terminal device sends reference signals to the serving base station and the non-serving base station respectively according to the SRS configuration information.

The reference signal includes an SRS sounding reference signal.

Step 505: the serving base station and the non-serving base station determine frequency-domain channel responses of subcarriers corresponding to the reference signals according to the reference signals.

The serving base station and the non-serving base station receive the SRS sounding reference signals according to the SRS configuration information, and estimate the frequency-domain channel responses by the SRS sounding reference signals.

Step 506: the serving base station and the non-serving base station determine time-domain channel responses according to the frequency-domain channel responses.

Step 507: the serving base station and the non-serving base station perform filtering processing on the time-domain channel responses to obtain line-of-sight time-domain signals.

According to the time-domain channel responses, the serving base station and the non-serving base station obtain integer multiple sampling points $[\dot{\tau}_1]$ closest to true propagation delays $\dot{\tau}_1$ by a cross-correlation algorithm, and design time-domain filters around the integer multiple sampling points $[\dot{\tau}_1]$ to perform filtering processing on the time-domain channel responses, to eliminate the influence of non-line-of-sight. For the time-domain filters, Formula (3) can be referred to.

Step 508: the serving base station and the non-serving base station measure subcarrier phase information according to the line-of-sight time-domain signals.

The serving base station and the non-serving base station perform Fourier transform (as shown in Formula (4)) on the line-of-sight time-domain signals subject to the filtering processing, and then perform phase extraction operations on the N/2-th subcarriers (as shown in Formula (8)). After equivalent conversion or normalization processing (as shown in Formula (9)), measurement values of the subcarrier phase information (as shown in Formula (10)) can be obtained.

Step 509: the serving base station and the non-serving base station send the subcarrier phase information determined by themselves to the location server.

Step 510: the location server determines the location information of the terminal device according to the subcarrier phase information sent by the serving base station and the non-serving base station.

The location server may also combine other TOA/TDOA and angle of arrive (AOA) information for joint locating.

It should be understood that the embodiment shown in FIG. 5 only shows a process of locating the terminal device within one locating period. In a specific implementation process, it may also be applicable to multiple locating periods, to track a motion trajectory of the terminal device.

In the terminal device locating method provided by the present disclosure, the time-domain channel response of the reference signal is determined according to the received reference signal; filtering processing is performed on the time-domain channel response to obtain the line-of-sight time-domain signal; and the subcarrier phase information of the line-of-sight frequency-domain signal corresponding to the line-of-sight time-domain signal is determined according to the line-of-sight time-domain signal, where the subcarrier phase information is used to determine the location information of the terminal device. Because the line-of-sight time-domain signal can be obtained by performing filtering processing on the time-domain channel response of the reference signal, the multipath effect can be eliminated. According to the obtained line-of-sight time-domain signal, the subcarrier phase information of the line-of-sight frequency-domain signal corresponding to the line-of-sight time-domain signal can be directly extracted, and the propagation delay of the reference signal can be determined according to the subcarrier phase information. Since the propagation delay determined according to the subcarrier phase information of the line-of-sight frequency-domain signal is not affected by the sampling rate, the accuracy of the propagation delay can be improved through the above manner, and thus the accuracy of the location information of the terminal device determined based on the propagation delay can be further improved.

Figure 6:
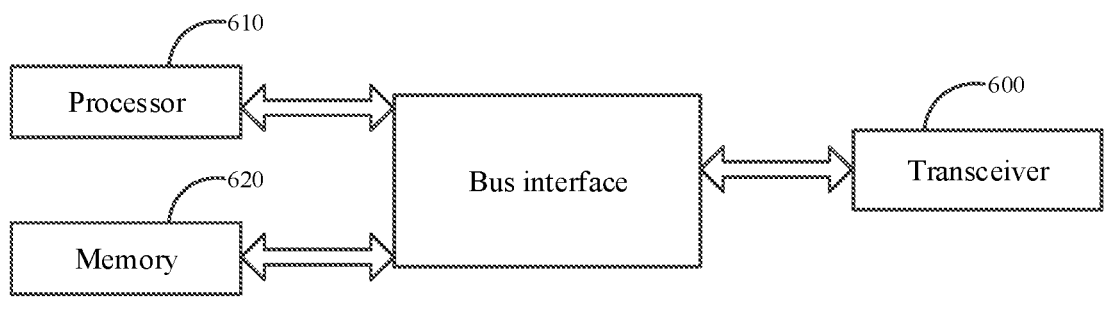
FIG. 6 is a schematic diagram of a first network element provided by an embodiment of the present disclosure.

FIG. 6 is a schematic diagram of a first network element provided by an embodiment of the present disclosure. As shown in FIG. 6, a transceiver 600 is configured to receive and transmit data under control of a processor 610.

In FIG. 6, a bus architecture may include any number of interconnected buses and bridges, and specifically, various circuits of one or more processors represented by the processor 610 and a memory represented by a memory 620 are linked together. The bus architecture may also link various other circuits, such as a peripheral device, a voltage regulator, a power management circuit and the like, which are well known in the art and will thus not be further described here. A bus interface provides an interface. The transceiver 600 may be multiple elements, including a transmitter and a receiver, and provide a unit for communication with various other apparatuses on transmission media. These transmission media include a wireless channel, a wired channel, an optical cable and other transmission media. The processor 610 is responsible for managing the bus architecture and general processing, and the memory 620 can store data used by the processor 610 when executing operations.

The processor 610 may be a central processing unit (CPU), an application specific integrated circuit (ASIC), a field-programmable gate array (FPGA), or a complex programmable logic device (CPLD), and the processor may also adopt a multi-core architecture.

By calling a computer program stored in the memory, the processor is configured to execute any of the methods provided by the embodiments of the present disclosure in accordance with obtained executable instructions. The processor and the memory may also be physically separated.

The processor 610 is configured to read the computer program in the memory and execute the following operations:

receiving a reference signal;

determining a time-domain channel response of the reference signal according to the reference signal;

performing filtering processing on the time-domain channel response to obtain a line-of-sight time-domain signal;

determining subcarrier phase information of a line-of-sight frequency-domain signal according to the line-of-sight time-domain signal, where the subcarrier phase information is used to determine location information of a terminal device.

In one embodiment, the processor 610 is specifically configured to:

convert the line-of-sight time-domain signal into a frequency-domain signal through Fourier transform;

determine, according to an index of a subcarrier corresponding to the frequency-domain signal, a frequency-domain channel response of the subcarrier;

extract the subcarrier phase information from the frequency-domain channel response.

In one embodiment, the processor 610 is specifically configured to:

determine a frequency-domain channel response of a subcarrier corresponding to the reference signal according to the reference signal;

determine the time-domain channel response according to the frequency-domain channel response.

In one embodiment, the processor 610 is specifically configured to:

perform filtering processing on the time-domain channel response to obtain the line-of-sight time-domain signal according to the following formula:

$$h_{ic}^m[n] = \begin{cases} h^m[n], & n = [\hat{\tau}_1] \\ 0, & \text{otherwise} \end{cases},$$

where $$h_{ic}^m[n]$$

represents the line-of-sight time-domain signal, $h^m[n]$ represents a time-domain channel response of the m-th orthogonal frequency division multiplexing OFDM symbol at the n-th time-domain sampling point, $\hat{\tau}_1$ is a line-of-sight signal propagation delay of a reference signal between a network device and the terminal device, and n and m are positive integers.

In one embodiment, the first network element is the terminal device; and the processor 610 is specifically configured to:

determine an integer ambiguity of a distance between the terminal device and a network device according to the subcarrier phase information;

determine a measurement distance between the terminal device and the network device according to the subcarrier phase information and the integer ambiguity;

determine the location information of the terminal device according to the measurement distance between the terminal device and the network device.

In one embodiment, the processor 610 is specifically configured to:

determine the measurement distance between the terminal device and the network device according to a formula $$d_r^i = \lambda\left(\phi_r^i + N_r^i\right)$$

where $$d_r^i$$

represents a measurement distance between the i-th network device and the r-th terminal device, $$\phi_r^i$$

represents subcarrier phase information from the i-th network device to the r-th terminal device, $\lambda$ represents a wavelength, $$N_r^i$$

represents an integer ambiguity of a distance between the i-th network device and the r-th terminal device, and both i and r are positive integers.

In one embodiment, the processor 610 is specifically configured to:

acquire a time of arrival TOA measurement value between the terminal device and the network device;

determine the integer ambiguity according to the subcarrier phase information and the TOA measurement value.

In one embodiment, the processor 610 is specifically configured to:

determine the integer ambiguity according a formula $$N_r^i = \left[\frac{T_r^i}{\lambda} - \phi_r^i\right],$$

where [*] represents rounding a number in parentheses, $$N_r^i$$

represents the integer ambiguity of the distance between the i-th network device and the r-th terminal device, $$T_r^i$$

represents a TOA measurement value between the i-th network device and the r-th terminal device, $$\phi_r^i$$

represents the subcarrier phase information from the i-th network device to the r-th terminal device, and $\lambda$ represents the wavelength.

In one embodiment, the first network element is a network device; and the processor 610 is specifically configured to:

send the subcarrier phase information to a location server, where the subcarrier phase information is used to indicate that the location server is to determine the location information of the terminal device.

It should be noted here that the above apparatus provided by the present disclosure can implement all the method steps implemented by the above method embodiments, and can achieve the same effects. The part of this embodiment which is same as the method embodiments and the beneficial effects will not be described in detail here.

Figure 7:
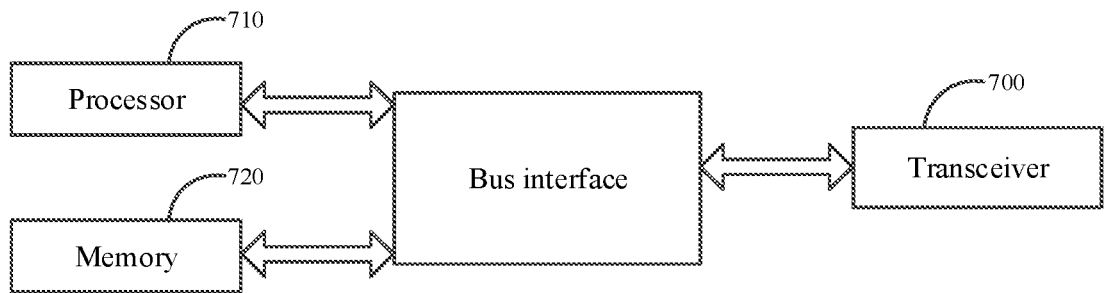
FIG. 7 is a schematic diagram of a location server provided by an embodiment of the present disclosure.

FIG. 7 is a schematic diagram of a location server provided by an embodiment of the present disclosure. As shown in FIG. 7, a transceiver 700 is configured to receive and transmit data under control of a processor 710.

In FIG. 7, a bus architecture may include any number of interconnected buses and bridges, and specifically, various circuits of one or more processors represented by the processor 710 and a memory represented by a memory 720 are linked together. The bus architecture may also link various other circuits, such as a peripheral device, a voltage regulator, a power management circuit and the like, which are well known in the art and will thus not be further described here. A bus interface provides an interface. The transceiver 700 may be multiple elements, including a transmitter and a receiver, and provide a unit for communication with various other apparatuses on transmission media. These transmission media include a wireless channel, a wired channel, an optical cable and other transmission media. The processor 710 is responsible for managing the bus architecture and general processing, and the memory 720 can store data used by the processor 710 when executing operations.

The processor 710 may be a central processing unit (CPU), an application specific integrated circuit (ASIC), a field-programmable gate array (FPGA), or a complex programmable logic device (CPLD), and the processor may also adopt a multi-core architecture.

By calling a computer program stored in the memory, the processor is configured to execute any of the methods provided by the embodiments of the present disclosure in accordance with obtained executable instructions. The processor and the memory may also be physically separated.

The processor 710 is configured to read the computer program in the memory and execute the following operations:

receiving subcarrier phase information of a line-of-sight frequency-domain signal of a reference signal sent by a network device, where the line-of-sight frequency-domain signal is obtained by the network device in a following manner: determining a time-domain channel response of the reference signal after receiving the reference signal, performing filtering processing on the time-domain channel response, and converting an obtained line-of-sight time-domain signal, where the reference signal is sent by a terminal device to the network device;

determining location information of the terminal device according to the subcarrier phase information.

In one embodiment, the processor 710 is specifically configured to:

determine an integer ambiguity of a distance between the terminal device and the network device according to the subcarrier phase information;

determine a measurement distance between the terminal device and the network device according to the subcarrier phase information and the integer ambiguity;

determine the location information of the terminal device according to the measurement distance between the terminal device and the network device.

In one embodiment, the processor 710 is specifically configured to:

determine the measurement distance between the terminal device and the network device according to a formula $$d_r^i = \lambda\left(\phi_r^i + N_r^i\right)$$

where $$d_r^i$$

represents a measurement distance between the i-th network device and the r-th terminal device, $$\phi_r^i$$

represents subcarrier phase information from the i-th network device to the r-th terminal device, $\lambda$ represents a wavelength, $$N_r^i$$

represents an integer ambiguity of a distance between the i-th network device and the r-th terminal device, and both i and r are positive integers.

In one embodiment, the processor 710 is specifically configured to:

receive a time of arrival TOA measurement value between the terminal device and the network device sent by the network device;

determine the integer ambiguity according to the subcarrier phase information and the TOA measurement value.

In one embodiment, the processor 710 is specifically configured to:

determine the integer ambiguity according a formula $$N_r^i = \left[\frac{T_r^i}{\lambda} - \phi_r^i\right],$$

where [*] represents rounding a number in parentheses, $$N_r^i$$

represents the integer ambiguity of the distance between the i-th network device and the r-th terminal device, $$T_r^i$$

represents a TOA measurement value between the i-th network device and the r-th terminal device, $$\phi_r^i$$

represents the subcarrier phase information from the i-th network device to the r-th terminal device, and $\lambda$ represents the wavelength.

It should be noted here that the above apparatus provided by the present disclosure can implement all the method steps implemented by the above method embodiments, and can achieve the same effects. The part of this embodiment which is same as the method embodiments and the beneficial effects will not be described in detail here.

Figure 8:
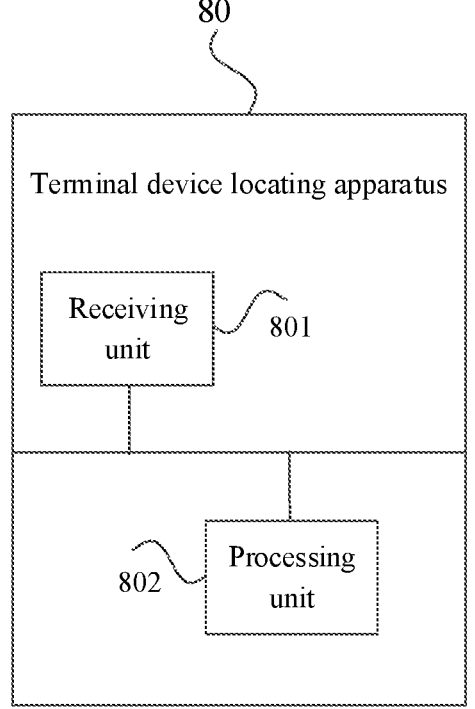
FIG. 8 is a schematic diagram of a terminal device locating apparatus provided by an embodiment of the present disclosure.

FIG. 8 is a schematic diagram of a terminal device locating apparatus provided by an embodiment of the present disclosure. Exemplarily, as shown in FIG. 8, the terminal device locating apparatus 80 may include:

a receiving unit 801, configured to receive a reference signal;

a processing unit 802, configured to determine a time-domain channel response of the reference signal according to the reference signal;

the processing unit 802 is further configured to perform filtering processing on the time-domain channel response to obtain a line-of-sight time-domain signal;

the processing unit 802 is further configured to determine subcarrier phase information of a line-of-sight frequency-domain signal according to the line-of-sight time-domain signal, where the subcarrier phase information is used to determine location information of a terminal device.

In a possible implementation, the processing unit 802 is specifically configured to:

convert the line-of-sight time-domain signal into a frequency-domain signal through Fourier transform;

determine, according to an index of a subcarrier corresponding to the frequency-domain signal, a frequency-domain channel response of the subcarrier;

extract the subcarrier phase information from the frequency-domain channel response.

In a possible implementation, the processing unit 802 is specifically configured to:

determine a frequency-domain channel response of a subcarrier corresponding to the reference signal according to the reference signal;

determine the time-domain channel response according to the frequency-domain channel response.

In a possible implementation, the processing unit 802 is specifically configured to:

perform filtering processing on the time-domain channel response to obtain the line-of-sight time-domain signal according to the following formula:

$$h_{tc}^m[n] = \begin{cases} h^m[n], & n = [\hat{t}_1] \\ 0, & \text{otherwise} \end{cases},$$

where $$h_{ic}^{m}[n]$$

represents the line-of-sight time-domain signal, $h^m[n]$ represents a time-domain channel response of the m-th orthogonal frequency division multiplexing OFDM symbol at the n-th time-domain sampling point, $\dot{\tau}_1$ is a line-of-sight signal propagation delay of a reference signal between a network device and the terminal device, and n and m are positive integers.

In a possible implementation, the apparatus is the terminal device; and the processing unit 802 is specifically configured to:

determine an integer ambiguity of a distance between the terminal device and a network device according to the subcarrier phase information;

determine a measurement distance between the terminal device and the network device according to the subcarrier phase information and the integer ambiguity;

determine the location information of the terminal device according to the measurement distance between the terminal device and the network device.

In a possible implementation, the processing unit 802 is specifically configured to:

determine the measurement distance between the terminal device and the network device according to a formula $$d_r^i = \lambda\left(\phi_r^i + N_r^i\right)$$

where $$d_r^i$$

represents a measurement distance between the i-th network device and the r-th terminal device, $$\phi_r^i$$

represents subcarrier phase information from the i-th network device to the r-th terminal device, $\lambda$ represents a wavelength, $$N_r^i$$

represents an integer ambiguity of a distance between the i-th network device and the r-th terminal device, and both i and r are positive integers.

In a possible implementation, the processing unit 802 is specifically configured to:

acquire a time of arrival TOA measurement value between the terminal device and the network device;

determine the integer ambiguity according to the subcarrier phase information and the TOA measurement value.

In a possible implementation, the processing unit 802 is specifically configured to:

determine the integer ambiguity according a formula $$N_r^i = \left[\frac{T_r^i}{\lambda} - \phi_r^i\right],$$

where [*] represents rounding a number in parentheses, $$N_r^i$$

represents the integer ambiguity of the distance between the i-th network device and the r-th terminal device, $$T_r^i$$

represents a TOA measurement value between the i-th network device and the r-th terminal device, $$\phi_r^i$$

represents the subcarrier phase information from the i-th network device to the r-th terminal device, and $\lambda$ represents the wavelength.

In a possible implementation, the apparatus is a network device; and the processing unit 802 is specifically configured to:

send the subcarrier phase information to a location server, where the subcarrier phase information is used to indicate that the location server is to determine the location information of the terminal device.

Figure 9:
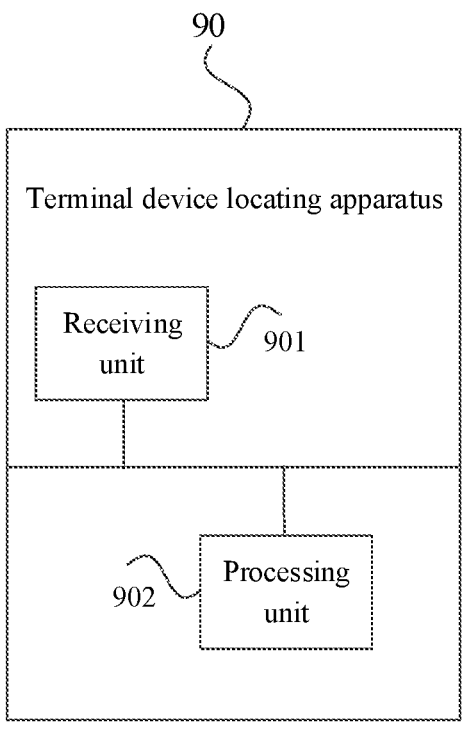
FIG. 9 is a schematic diagram of a terminal device locating apparatus provided by an embodiment of the present disclosure.

FIG. 9 is a schematic diagram of a terminal device locating apparatus provided by an embodiment of the present disclosure. Exemplarily, as shown in FIG. 9, the terminal device locating apparatus 90 may include:

a receiving unit 901, configured to receive subcarrier phase information of a line-of-sight frequency-domain signal of a reference signal sent by a network device, where the line-of-sight frequency-domain signal is obtained by the network device in a following manner: determining a time-domain channel response of the reference signal after receiving the reference signal, performing filtering processing on the time-domain channel response, and converting an obtained line-of-sight time-domain signal, where the reference signal is sent by a terminal device to the network device;

a processing unit 902, configured to determine location information of the terminal device according to the subcarrier phase information.

In one embodiment, the processing unit 902 is specifically configured to:

determine an integer ambiguity of a distance between the terminal device and the network device according to the subcarrier phase information;

determine a measurement distance between the terminal device and the network device according to the subcarrier phase information and the integer ambiguity;

determine the location information of the terminal device according to the measurement distance between the terminal device and the network device.

In one embodiment, the processing unit 902 is specifically configured to:

determine the measurement distance between the terminal device and the network device according to a formula $$d_r^i = \lambda\left(\phi_r^i + N_r^i\right)$$

where $$d_r^i$$

represents a measurement distance between the i-th network device and the r-th terminal device, $$\phi_r^i$$

represents subcarrier phase information from the i-th network device to the r-th terminal device, $\lambda$ represents a wavelength, $$N_r^i$$

represents an integer ambiguity of a distance between the i-th network device and the r-th terminal device, and both i and r are positive integers.

In one embodiment, the processing unit 902 is specifically configured to:

receive a time of arrival TOA measurement value between the terminal device and the network device sent by the network device;

determine the integer ambiguity according to the subcarrier phase information and the TOA measurement value.

In one embodiment, the processing unit 902 is specifically configured to:

determine the integer ambiguity according a formula $$N_r^i = \left[\frac{T_r^i}{\lambda} - \phi_r^i\right],$$

where [*] represents rounding a number in parentheses, $$N_r^i$$

represents the integer ambiguity of the distance between the i-th network device and the r-th terminal device, $$T_r^i$$

represents a TOA measurement value between the i-th network device and the r-th terminal device, $$\phi_r^i$$

represents the subcarrier phase information from the i-th network device to the r-th terminal device, and $\lambda$ represents the wavelength.

It should be noted here that the above apparatus provided by the present disclosure can implement all the method steps implemented by the above method embodiments, and can achieve the same effects. The part of this embodiment which is same as the method embodiments and the beneficial effects will not be described in detail here.

It should be noted that a division of units in the embodiments of the present disclosure is schematic and is only a logical function division, and there may be other division manners in actual implementation. In addition, the functional units in the embodiments of the present disclosure may be integrated in one processing unit, or each unit may exist physically alone, or two or more units may be integrated in one unit. The above-mentioned integrated unit may be implemented in a form of hardware or a software functional unit.

If implemented in the form of the software functional unit and sold or used as an independent product, the integrated unit may be stored in a processor-readable storage medium. Based on this understanding, a solution of the present disclosure essentially or a part thereof that contributes to the related art or all or part of the solution can be embodied in a form of a software product. The computer software product is stored in a storage medium and includes several instructions for making a computer device (which may be a personal computer, a server, or a network device, etc.) or a processor execute all or part of steps of the methods described in the embodiments of the present disclosure. The aforementioned storage medium includes: a U disk, a mobile hard disk, a read-only memory (ROM), a random access memory (RAM), a magnetic disk, an optical disk or other media that can store program codes.

An embodiment of the present disclosure further provides a processor-readable storage medium. The processor-readable storage medium stores a computer program, and the computer program is used to cause a processor to execute the terminal device locating method provided by the above method embodiments.

An embodiment of the present disclosure further provides a computer program product, including a computer program, and when the computer program is executed by a processor, the terminal device locating method provided by the above method embodiments is implemented.

The processor-readable storage medium may be any available medium or data storage device that the processor can access, including but not limited to, a magnetic memory (such as a floppy disk, a hard disk, a magnetic tape, a magneto-optical disk (MO), etc.), an optical memory (such as a CD, a DVD, a BD, a HVD, etc.), and a semiconductor memory (such as a ROM, an EPROM, an EEPROM, a non-volatile memory (NAND FLASH), a solid state disk (SSD)), etc.

The embodiments of the present disclosure can be provided as methods, systems or computer program products. Therefore, the present disclosure may take forms of entire-hardware embodiments, entire-software embodiments, or embodiments combining software and hardware aspects. Furthermore, the present disclosure may take a form of a computer program product implemented on one or more computer-usable storage media (including but not limited to a disk storage, an optical storage, etc.) in which computer-usable program codes are included.

The present disclosure is described with reference to flowcharts and/or block diagrams of methods, devices (systems) and computer program products according to the embodiments of the present disclosure. It should be understood that each flow and/or block in the flowcharts and/or block diagrams, and a combination of flows and/or blocks in the flowcharts and/or block diagrams may be implemented by computer-executable instructions. These computer-executable instructions may be provided to a processor of a general-purpose computer, a special-purpose computer, an embedded processor or other programmable data processing devices to produce a machine, and an apparatus for implementing functions specified in one or more flows of the flowcharts and/or one or more blocks of the block diagrams is produced by instructions executed by the processor of the computer or other programmable data processing devices.

These processor-executable instructions may also be stored in a processor-readable memory that can guide a computer or other programmable data processing devices to work in a specific way, and the instructions stored in the processor-readable memory produce a manufactured product including an instruction apparatus, and the instruction apparatus implements functions specified in one or more flows of the flowcharts and/or one or more blocks of the block diagrams.

These processor-executable instructions may also be loaded on a computer or other programmable data processing devices, and a series of operation steps are executed on the computer or other programmable devices to produce computer-implemented processing, and the instructions executed on the computer or other programmable devices provide steps for implementing functions specified in one or more flows of the flowcharts and/or one or more blocks of the block diagrams.

Various modifications and variations to the present disclosure without departing from the scope of the present disclosure may be made. Thus, if these modifications and variations of the present disclosure are within the scope of claims of the present disclosure and their equivalent technology, the present disclosure is also intended to include these modifications and variations.

The invention claimed is:

1. A terminal device locating method, wherein the method is applied to a first network element, and the method comprises:

receiving a reference signal;

determining a time-domain channel response of the reference signal according to the reference signal, wherein the time-domain channel response comprises a line-of-sight time-domain signal and a reflection path signal;

performing filtering processing on the time-domain channel response to obtain the line-of-sight time-domain signal;

determining subcarrier phase information of a line-of-sight frequency-domain signal according to the line-of-sight time-domain signal, wherein the subcarrier phase information is used to determine location information of a terminal device.

2. The method according to claim 1, wherein determining the subcarrier phase information of the line-of-sight frequency-domain signal according to the line-of-sight time-domain signal comprises:

converting the line-of-sight time-domain signal into a frequency-domain signal through Fourier transform;

determining, according to an index of a subcarrier corresponding to the frequency-domain signal, a frequency-domain channel response of the subcarrier;

extracting the subcarrier phase information of the line-of-sight frequency-domain signal from the frequency-domain channel response.

3. The method according to claim 1, wherein performing filtering processing on the time-domain channel response to obtain the line-of-sight time-domain signal comprises:

performing filtering processing on the time-domain channel response to obtain the line-of-sight time-domain signal according to the following formula:

$$h_{ic}^m[n] = \begin{cases} h'''[n], & n = [\dot{t}_1] \\ 0, & \text{otherwise} \end{cases},$$

wherein $$h_{ic}^m[n]$$

$h'''[n]$ represents the line-of-sight time-domain signal, $h'''[n]$ represents a time-domain channel response of an m-th orthogonal frequency division multiplexing OFDM symbol at an n-th time-domain sampling point, $\dot{\tau}_1$ is a line-of-sight signal propagation delay of a reference signal between a network device and the terminal device, and n and m are positive integers.

4. The method according to claim 1, wherein the first network element is the terminal device, and the method further comprises:

determining an integer ambiguity of a distance between the terminal device and a network device according to the subcarrier phase information;

determining a measurement distance between the terminal device and the network device according to the subcarrier phase information and the integer ambiguity;

determining the location information of the terminal device according to the measurement distance between the terminal device and the network device.

5. The method according to claim 4, wherein determining the measurement distance between the terminal device and the network device according to the subcarrier phase information and the integer ambiguity comprises:

determining the measurement distance between the terminal device and the network device according to a formula $$d_r^i = \lambda(\phi_r^i + N_r^i)$$

wherein $$d_r^i$$

represent a measurement distance between an i-th network device and an r-th terminal device, $$\phi_r^i$$

45

46 represents subcarrier phase information from the i-th network device to the r-th terminal device, $\lambda$ represents a wavelength, $$N_r^i$$

represents an integer ambiguity of a distance between the i-th network device and the r-th terminal device, and both i and rare positive integers.

6. The method according to claim 5, wherein determining the integer ambiguity of the distance between the terminal device and the network device according to the subcarrier phase information comprises:

acquiring a time of arrival TOA measurement value between the terminal device and the network device;

determining the integer ambiguity according to the subcarrier phase information and the TOA measurement value;

wherein determining the integer ambiguity according to the subcarrier phase information and the TOA measurement value comprises:

determining the integer ambiguity according to a formula $$N_r^i = \left[ \frac{T_r^i}{\lambda} - \phi_r^i \right],$$

wherein [*] represents rounding a number in parentheses, $$N_r^i$$

represents the integer ambiguity of the distance between the i-th network device and the r-th terminal device, $$T_r^i$$

represents a TOA measurement value between the i-th network device and the r-th terminal device, $$\phi_r^i$$

represents the subcarrier phase information from the i-th network device to the r-th terminal device, and $\lambda$ represents the wavelength.

7. The method according to claim 1, wherein the first network element is a network device, and the method further comprises:

sending the subcarrier phase information to a location server, wherein the subcarrier phase information is used to indicate that the location server is to determine the location information of the terminal device.

8. A terminal device locating method, wherein the method is applied to a location server, and the method comprises:

receiving subcarrier phase information of a line-of-sight frequency-domain signal of a reference signal sent by a network device, wherein the line-of-sight frequency-domain signal is obtained by the network device in a following manner: determining a time-domain channel response of the reference signal after receiving the reference signal, performing filtering processing on the time-domain channel response to obtain a line-of-sight time-domain signal, and converting the line-of-sight time-domain signal, wherein the reference signal is sent by the terminal device to the network device, wherein the time-domain channel response comprises the line-of-sight time-domain signal and a reflection path signal;

determining location information of the terminal device according to the subcarrier phase information.

9. The method according to claim 8, wherein determining the location information of the terminal device according to the subcarrier phase information comprises:

determining an integer ambiguity of a distance between the terminal device and the network device according to the subcarrier phase information;

determining a measurement distance between the terminal device and the network device according to the subcarrier phase information and the integer ambiguity;

determining the location information of the terminal device according to the measurement distance between the terminal device and the network device.

10. The method according to claim 9, wherein determining the measurement distance between the terminal device and the network device according to the subcarrier phase information and the integer ambiguity comprises:

determining the measurement distance between the terminal device and the network device according to a formula $$d_r^i = \lambda \left( \phi_r^i + N_r^i \right)$$

wherein $$d_r^i$$

represents a measurement distance between an i-th network device and an r-th terminal device, $$\phi_r^i$$

represents subcarrier phase information from the i-th network device to the r-th terminal device, $\lambda$ represents a wavelength, $$N_r^i$$

represents an integer ambiguity of a distance between the i-th network device and the r-th terminal device, and both i and rare positive integers.

11. The method according to claim 9, wherein determining the integer ambiguity of the distance between the terminal device and the network device according to the subcarrier phase information comprises:

receiving a time of arrival TOA measurement value between the terminal device and the network device sent by the network device;

determining the integer ambiguity according to the subcarrier phase information and the TOA measurement value;

wherein determining the integer ambiguity according to the subcarrier phase information and the TOA measurement value comprises:

determining the integer ambiguity according to a formula $$N_r^i = \left[ \frac{T_r^i}{\lambda} - \phi_r^i \right],$$

wherein [*] represents rounding a number in parentheses, $$N_r^i$$

represents an integer ambiguity of a distance between an i-th network device and an r-th terminal device, $$T_r^i$$

represents a TOA measurement value between the i-th network device and the r-th terminal device, $$\phi_r^i$$

represents subcarrier phase information from the i-th network device to the r-th terminal device, and A represents a wavelength.

12. A terminal device locating apparatus, comprising a memory, a transceiver and a processor;

the memory is configured to store a computer program; the transceiver is configured to transceive data under control of the processor; the processor is configured to read the computer program in the memory and execute the following operations:

receiving a reference signal;

determining a time-domain channel response of the reference signal according to the reference signal, wherein the time-domain channel response comprises a line-of-sight time-domain signal and a reflection path signal;

performing filtering processing on the time-domain channel response to obtain the line-of-sight time-domain signal;

determining subcarrier phase information of a line-of-sight frequency-domain signal according to the line-of-sight time-domain signal, wherein the subcarrier phase information is used to determine location information of a terminal device.

13. The terminal device locating apparatus according to claim 12, wherein the processor is specifically configured to:

convert the line-of-sight time-domain signal into a frequency-domain signal through Fourier transform;

determine, according to an index of a subcarrier corresponding to the frequency-domain signal, a frequency-domain channel response of the subcarrier;

extract the subcarrier phase information of the line-of-sight frequency-domain signal from the frequency-domain channel response.

14. The terminal device locating apparatus according to claim 12, wherein the processor is specifically configured to:

perform filtering processing on the time-domain channel response to obtain the line-of-sight time-domain signal according to the following formula:

$$h_{ic}^m[n] = \begin{cases} h^m[n], & n = [\hat{\tau}_1] \\ 0, & \text{otherwise} \end{cases},$$

wherein $$h_{ic}^m[n]$$

represents the line-of-sight time-domain signal, $h^m[n]$ represents a time-domain channel response of an m-th orthogonal frequency division multiplexing OFDM symbol at an n-th time-domain sampling point, $\hat{\tau}_1$ is a line-of-sight signal propagation delay of a reference signal between a network device and the terminal device, and n and m are positive integers.

15. The terminal device locating apparatus according to claim 12, wherein the apparatus is the terminal device; and the processor is specifically configured to:

determine an integer ambiguity of a distance between the terminal device and a network device according to the subcarrier phase information;

determine a measurement distance between the terminal device and the network device according to the subcarrier phase information and the integer ambiguity;

determine the location information of the terminal device according to the measurement distance between the terminal device and the network device;

and/or, the apparatus is a network device; and the processor is specifically configured to:

send the subcarrier phase information to a location server, wherein the subcarrier phase information is used to indicate that the location server is to determine the location information of the terminal device.

16. The terminal device locating apparatus according to claim 15, wherein the processor is specifically configured to:

determine the measurement distance between the terminal device and the network device according to a formula $$d_r^i = \lambda \left( \phi_r^i + N_r^i \right),$$

wherein $$d_r^i$$

represents a measurement distance between an i-th network device and an r-th terminal device, $$\phi_r^i$$

represents subcarrier phase information from the i-th network device to the r-th terminal device, $\lambda$ represents a wavelength, $$N_r^i$$

represents an integer ambiguity of a distance between the i-th network device and the r-th terminal device, and both i and r are positive integers.

17. The terminal device locating apparatus according to claim 16, wherein the processor is specifically configured to:

acquire a time of arrival TOA measurement value between the terminal device and the network device;

determine the integer ambiguity according to the subcarrier phase information and the TOA measurement value;

wherein the processor is specifically configured to:

determine the integer ambiguity according to a formula wherein $$N_r^i = \left[ \frac{T_r^i}{\lambda} - \phi_r^i \right],$$

wherein [*] represents rounding a number in parentheses, $$N_r^i$$

represents the integer ambiguity of the distance between the i-th network device and the r-th terminal device, $$T_r^i$$

represents a TOA measurement value between the i-th network device and the r-th terminal device, $$\phi_r^i$$

represents the subcarrier phase information from the i-th network device to the r-th terminal device, and λ represents the wavelength.

18. A terminal device locating apparatus, comprising a memory, a transceiver and a processor;

the memory is configured to store a computer program; the transceiver is configured to transceive data under control of the processor; the processor is configured to read the computer program in the memory and execute the method according to claim 8.

19. A non-transitory processor-readable storage medium, wherein the non-transitory processor-readable storage medium stores a computer program, and the computer program is used to cause a processor to execute the method according to claim 1.

20. A non-transitory processor-readable storage medium, wherein the non-transitory processor-readable storage medium stores a computer program, and the computer program is used to cause a processor to execute the method according to claim 8.

\* \* \* \* \*